(12) United States Patent
Joao et al.

(10) Patent No.: US 9,668,304 B2
(45) Date of Patent: May 30, 2017

(54) FOOD PROCESSING APPARATUS AND METHOD

(71) Applicants: Raymond Anthony Joao, Yonkers, NY (US); Mary Antonette Spano, Yonkers, NY (US)

(72) Inventors: Raymond Anthony Joao, Yonkers, NY (US); Mary Antonette Spano, Yonkers, NY (US)

( * ) Notice: Subject to any disclaimer, the term of this patent is extended or adjusted under 35 U.S.C. 154(b) by 0 days.

(21) Appl. No.: 14/717,303

(22) Filed: May 20, 2015

(65) Prior Publication Data

US 2015/0342413 A1    Dec. 3, 2015

Related U.S. Application Data

(60) Provisional application No. 62/027,630, filed on Jul. 22, 2014, provisional application No. 62/007,099, filed on Jun. 3, 2014.

(51) Int. Cl.
| | | |
|---|---|---|
| *A47J 19/06* | (2006.01) | |
| *H05B 3/68* | (2006.01) | |
| *A47J 43/044* | (2006.01) | |
| *A47J 43/08* | (2006.01) | |
| *A47J 27/00* | (2006.01) | |
| *H05B 1/02* | (2006.01) | |
| *H05B 3/22* | (2006.01) | |
| *H05B 3/42* | (2006.01) | |

(52) U.S. Cl.
CPC .............. *H05B 3/68* (2013.01); *A47J 27/004* (2013.01); *A47J 43/044* (2013.01); *A47J 43/082* (2013.01); *H05B 1/0258* (2013.01); *H05B 3/22* (2013.01); *H05B 3/42* (2013.01); *A47J 2043/04436* (2013.01)

(58) Field of Classification Search
CPC ...... A47J 43/044; A47J 43/082; A47J 27/004; A47J 2043/04436
USPC .......... 99/510, 513, 348, 355, 327; 366/192, 366/194, 146, 244, 245, 247–251, 242, 366/149, 145
See application file for complete search history.

(56) References Cited

U.S. PATENT DOCUMENTS

| | | | | |
|---|---|---|---|---|
| 6,155,161 | A * | 12/2000 | Chan ....................... | A47J 36/16 366/146 |
| 6,212,953 | B1 * | 4/2001 | Bethune .................. | G01F 19/00 73/427 |
| 8,136,979 | B1 * | 3/2012 | Reynolds ............ | A47J 43/1093 366/144 |

(Continued)

*Primary Examiner* — Phuong Nguyen
(74) *Attorney, Agent, or Firm* — Raymond A. Joao, Esq.

(57) ABSTRACT

An apparatus, including a food processor having a housing having a first section and second section, which second section is elongate in shape and houses at least a portion of a rotating member; a food processing attachment connected or attached to an end portion of the second section; and a plate capable of serving as a cover or lid for a cooking pot capable of being heated by a heating source. The plate has an opening for receiving the second section which is capable of being slideably moveable in and through the opening in a bi-directional manner to raise or lower a position of the food processing attachment, or to move the food processing attachment up or down, inside the cooking pot by a movement of the second section vertically up or down through the opening during a cooking or food processing operation in the cooking pot.

20 Claims, 25 Drawing Sheets

(56) References Cited

U.S. PATENT DOCUMENTS

2006/0263501 A1* 11/2006 Oghafua ............... A47J 27/004
                                                                   426/523

* cited by examiner

FOOD PROCESSING APPARATUS AND METHOD

RELATED APPLICATIONS

This application claims the benefit of the priority of U.S. Provisional Patent Application Ser. No. 62/027,630, filed Jul. 22, 2014, and entitled "FOOD PROCESSING APPARATUS AND METHOD", the subject matter and teachings of which are hereby incorporated by reference herein in their entirety. This application also claims the benefit of the priority of U.S. Provisional Patent Application Ser. No. 62/007,099, filed Jun. 3, 2014, and entitled "FOOD PROCESSING APPARATUS AND METHOD", the subject matter and teachings of which are hereby incorporated by reference herein in their entirety.

FIELD OF THE INVENTION

The present invention pertains to a food processing apparatus and method and, in particular, to a food processing apparatus and method which can be positioned on or over a top end portion, or an open end portion, of a cooking pot, a cooking container, a cooking utensil, or any other device or item which can be utilized for cooking, processing, or preparing, foods or food ingredients.

BACKGROUND OF THE INVENTION

Food processors, blenders, hand blenders, and the like, are well known in the prior art for performing various food processing, blending, or mixing, operations on, with, or regarding, foods and/or food ingredients of various types or kinds.

Traditional food processors and benders typically utilize food processing blades or elements or blending blades or elements which are located or situated at the bottom portion of the food container associated therewith. A motor or other actuating device in these food processors or blenders is typically located or situated in a housing located beneath the food processing blades or elements or blending blades or elements. Each time a food processing or blending operation is to be performed on or with food(s) or food ingredients, the food(s) or food ingredients, which are to be processed or blended, have to be placed into or inserted into or within a food container of the food processor or blender and on or over the food processing blades or elements or the blending blades or elements. A cover, to prevent the food or food ingredients from splattering out of the food container during food processing or blending, must be placed on or over the food container. Further, the need to move food or food ingredients from a cooking container into a food processor or blender can also be inconvenient and burdensome.

Hand blenders or handheld blenders (hereinafter "hand blenders") are also known which are typically portable devices which can be utilized to process or blend food(s) or food ingredients in a food container. Hand blenders are typically utilized by manually inserting or immersing the portion of same containing the processing blades or elements or the blending blades or elements into the food or food ingredients and manually processing or blending the food or food ingredients while holding and moving the hand blender throughout and/or during the food processing or blending operation. Typically, care must be taken so as to ensure that the food processing blades or elements or the blending blades or elements remain immersed within or submerged in the food or food ingredients during the processing or blending process so as to prevent the food or food ingredients from splattering and/or causing an unnecessary mess. Hand blenders also require that the user manually move the hand blender about in order to ensure that a complete processing and/or blending of the food or the food ingredients is achieved. Further, hand blenders also typically have smaller blades or processing elements which also requires that the operator of the hand blender move the processing or blending portion of same about in the food or food ingredients being processed.

As a result of the many shortfalls of the prior art food processing devices and/or blenders, there is a need for a food processor apparatus which can provide for convenient use and operation and which can be utilized in connection with, or in conjunction with, any type or kind of cooking container.

SUMMARY OF THE INVENTION

The present invention pertains to a food processing apparatus and method and, in particular, to a food processing apparatus and method which can be positioned on or over a top end portion, or an open end portion, of a cooking pot, a cooking container, a cooking utensil, or any other device or item which can be utilized for cooking, processing, or preparing, foods or food ingredients which overcomes the shortfalls of the prior art.

The present invention provides a food processing apparatus which can be utilized in connection with, or along with, any suitable cooking pot, cooking container, cooking utensil, or any other device or item which can be utilized for cooking, processing, or preparing, foods or food ingredients. The present invention also dispenses with the need to move or transfer food(s) or food ingredients from a cooking pot, cooking container, cooking utensil, or any other device or item which can be utilized for cooking, processing, or preparing, foods or food ingredients to another cooking pot, cooking container, cooking utensil, or any other device or item. The present invention can also be placed or situated on a top end portion or a cooking pot, cooking container, cooking utensil, or any other device or item, thereby dispensing with the need to be held or supported during use by a user or operator.

The apparatus of the present invention includes a housing which can include a main housing portion and a cylindrical housing portion which is connected to or attached to the main housing portion. The cylindrical housing portion can be detachable from the main housing portion in order to facilitate easy and convenient cleaning and/or sterilization of same. The apparatus can also include, on the top portion of the main housing, a handle which can be utilized to handle or maneuver the apparatus. The handle can be attached to, or can be an integrated component of, the main housing portion.

The handle can include an operating switch which can be utilized by a user or operator to activate and/or control an operation of the apparatus. The handle can also include an on/off switch which can be used for activating and/or deactivating the apparatus. The handle an also include a control panel which can include an any one or more of an on/off switch or device, a speed selector switch or device, and/or an operating mode selector or device. The apparatus of the present invention can be designed to operate various food processing attachments, blending attachments, mixing attachments, whisking attachments, or any other suitable attachments at various selectable speeds and/or in various modes of operation, such as, for example, but not limited to, a food processing mode, a blending mode, a mixing mode, a beating mode, a whipping mode, a whisking mode, or any other food preparation mode of operation.

The apparatus of the present invention can be designed to operate in a chopping operating mode, a mixing operating mode, a blending operating mode, a liquefying operating mode, a grating operating mode, a beating operating mode, a whipping operating mode. a whisking operating mode, a stirring operating mode, a pureeing operating mode, a pulsing operating mode, an ice crushing operating mode, a crumbing operating mode, an extracting operating mode, a dough preparing operating mode, a smoothie preparing operating mode, a high speed operating mode, or any other food processing operating mode, and/or any other food processing-related operating mode. The apparatus of the present invention can also be designed, preprogrammed, or programmable, to perform any number of operating modes in a sequential manner.

The main housing portion also includes a power cord which can be selected to have any appropriate or desired length and should be made of a suitable heat resistant material which can provide for safe use in high temperature environments. The apparatus of the present invention can also be equipped to be battery powered, in addition to, or instead of, being utilized in connection with a plug in power cord.

The cylindrical housing portion can include an upper end portion and a lower end portion. The cylindrical housing portion can be attached to or connected to the main housing portion at the bottom side portion thereof. The apparatus also includes a food processing attachment can be attached to the apparatus at the lower end portion of the cylindrical housing portion. The food processing attachment can include a main body, a plurality of food processing blades attached to the main body, and a mixing element which can be formed in the main body and which can be designed to facilitate mixing during the food processing process.

The food processing attachment can also include a spacer portion, about which the remainder of the food processing attachment can freely rotate, which spacer portion can serve to elevate and to protect the food processing attachment components and the food processing blades, which are situated above same, from coming into contact with the bottom of a respective cooking pot, cooking container, cooking utensil, or any other device or item, in connection with which the apparatus is being utilized. In this regard, the spacer portion is rotatably connected to the main body of the food processing attachment. Use of the spacer portion in conjunction with the apparatus of the present invention can be optional or can be utilized as needed or desired in order to elevate and to protect the components of a respective food processing attachment and/or any food processing blades or other processing elements, while also allowing the food processing attachment to rotate freely about the spacer portion and/or to rotate without interference, obstruction, or resistance, during a use and/or an operation of the apparatus of the present invention.

The main housing portion and the cylindrical housing portion can be made, manufactured, or formed, of steel, stainless steel, plastic, heat treated plastic, composite material, or any other suitable or appropriate material or materials, or any combination of same. The main housing portion houses an electric motor. The electric motor can be an alternating current (AC) motor which can be powered via the line cord. The apparatus can also be battery powered and can be equipped with direct current (DC) motor. The electric motor can also be either an AC motor or a DC motor and the apparatus can be equipped with any DC-AC conversion circuitry or equipment or AC-DC conversion circuitry or equipment in order to facilitate use of the apparatus with any type or kind of motor and any available power source. The main housing portion also houses a control device or a controller and any attendant circuitry and/or equipment activating, de-activating, enabling, or disabling, or controlling and/or all operations and functions which can be performed by the apparatus.

The cylindrical housing portion can be a hollow cylinder which can house can accommodate a rotating rod, shaft, or element, which can be utilized to drive an operation of the food processing attachment and the food processing blades or any other food processing attachments or devices which can be utilized in connection with the apparatus of the present invention.

Either or both of the main housing portion and/or the cylindrical housing portion can also house a drive mechanism which is associated with the electric motor and the drive mechanism mating element which is attached to or mated with the rotating rod, shaft, or element and which transfers the rotational energy or the rotating operation of the electric motor to the rotating rod, shaft, or element. Either or both of the cylindrical housing portion and/or the food processing attachment can house the food processor drive mating element which can transfer the rotational energy or the rotating operation of the rotating rod, shaft, or element, to the food processor attachment which causes the food processing blades to rotate or spin during operation. The food processing blades 22 are fixedly attached or connected to the food processor attachment so that the food processing blades turn or rotate with the respective mechanical components of the food processor attachment.

The apparatus of the present invention can also include a plate which can be of a circular shape. It is important to note that the plate can take any shape depending on the nature of the use of the apparatus and, therefore, the plate can be square in shape, rectangular in shape, oval in shape, or can be designed to have any other shape. The plate has a hole or opening in the center thereof through which the cylindrical housing portion of the apparatus can pass. The hole or opening of the plate can be lined with a rubber gasket or a similar or like element which can facilitate the placement and/or movement of the cylindrical housing portion within and/or through the hole or opening as described herein.

The hole or opening in the plate can also be designed or selected to be of sufficient diameter to allow the cylindrical housing portion to be inserted therein and/or there through and, once the apparatus is assembled for use, the plate and the cylindrical housing portion can be slideable or moveable about or relative to each other. For example, when the plate of the apparatus is fixed, the cylindrical housing portion can slide back and forth as needed through the hole or opening in the plate. Likewise, when the cylindrical housing portion may be fixed in position, the plate can be slideable or moveable along the cylindrical housing portion.

The plate can serve any number of functions. For example, the plate, which can be of any suitable size, diameter, or thickness, can be selected to be large enough so at to cover the contents of, and/or so as to extend beyond the sides of, any type, kind, or size of cooking pot, cooking container, cooking utensil, or any other device or item which can be utilized in connection with the apparatus of the present invention. The plate can be utilized, among other tings, to secure or to stabilize the apparatus on the top portion or on top of the respective cooking pot, cooking container, cooking utensil, or any other device or item, which can be utilized in connection with the apparatus of the present invention, or the plate can be utilized to prevent food from splattering from, or from or otherwise being expelled from, the respective cooking pot, cooking container, cooking utensil, or any other device or item, or can be utilized to provide a stable platform on or with which a user or operator can perform any food processing operation.

The apparatus of the present invention, by virtue of the fact that the plate and the cylindrical housing portion can be slideable along each other or with regards to each other, can be utilized in connection with cooking pots, cooking containers, cooking utensils, or any other devices or items having any depth or size. Also, since use of the apparatus of the present invention may involve placing the apparatus on top of a cooking pot, cooking container, cooking utensil, or other device or item, and lowering the food processing blades onto the food or food ingredients to be processed, the slidability of the plate vis-a-vis the cylindrical housing portion and vice versa, allows the user or operator to place the plate over the cooking pot, cooking container, cooking utensil, or other device or item, so as to prevent food therein from splattering, and so as to allow the user or operator to activate the apparatus in order to cut or slice through the food or food ingredients until the food processing attachment reaches the bottom of the cooking pot, cooking container, cooking utensil, or other device or item, at which time and/or position the apparatus can be utilized to perform the desired food processing operation.

In the above-described manner, a controlled "cut through" of the food or food ingredients from the top of same down can be effectuated in order to bring or situate the food processing blades to a preferred location near the bottom of the cooking pot, cooking container, cooking utensil, or other device or item. The slidability of the plate vis-a-vis the cylindrical housing portion and vice versa, also allows a user or operator to move the food processing blades up and down via the handle, to effectuate any desired food processing operation, while keeping the plate in place to prevent splattering and/or to stabilize the apparatus vis-a-vis the cooking pot, cooking container, cooking utensil, or other device or item.

The apparatus can also include components located within the housing and food processor attachment. Components located within the housing includes the electric motor, the control circuitry or controller which is in electrical connection with the electric motor so as to control an operation of same, the drive mechanism which is mechanically connected to the electric motor and which transfers the rotational energy of the electric motor to the rotating rod, shaft, or element. The drive mechanism and the rotating rod can be connected and secured together using suitable respective male and female connecting elements. For example, the drive mechanism can include, at the top portion of same and at the center thereof, a female connector section which can receive a male connector section located at the top end portion of the rotating rod and centrally positioned thereon.

The rotating rod can have a male connector section which can be secured in place in a female connector section of the drive mechanism and the rotating rod can be secured with the drive mechanism by using any suitable or appropriate securing elements, devices, or means, which are known by those persons skilled in the art for securing such connections. The respective connector sections can be of such a respective and corresponding shape(s) so as to ensure that the rotational energy of the drive mechanism is transferred to the rotating rod in a complete a manner as possible. In this regard, for example, the female connector section can have an opening which is square in shape while the male connector section can also be square in shape in order to mate with the female connector.

The rotating rod and the food processing attachment can be connected and secured together using suitable respective male and female connecting elements. For example, the rotating rod can include, at the bottom portion of same and at the center thereof, a female connector section which can receive a male connector section located at the top end portion of the food processing attachment and centrally positioned thereon. The male connector section of the food processing attachment can be received into and can be secured in place in and female connector section of the rotating rod can the food processor attachment can be secured with the rotating rod by using any suitable or appropriate securing elements, devices, or means, which are known by those persons skilled in the art for securing such connections.

The respective connector sections can be of such a respective and corresponding shape(s) so as to ensure that the rotational energy of the rotating rod is transferred to the food processing attachment in a complete a manner as possible. In this regard, for example, the female connector section can have an opening which is square in shape while the male connector section can also be square in shape in order to mate with the female connector. Although square shapes are described herein as being utilized in the design and/or selection of the various connector sections, it is important to note that, any shapes can be utilized in the design and selection of these respective connectors. For example, the various connector sections can be three-sided, four sided and rectangular, five-sided, six-sided, or have any number of sides, or can be square, rectangular, triangular, or have be, or can have, any appropriate or desired shape.

The food processing attachment, the plate, the cylindrical housing portion, the rotating rod, and/or any other components of the apparatus can be easily disassembled from the main housing portion so that they can be cleaned and/or sterilized after use and easily reassembled for future use.

The plate can also include on the lower side portion of same, a cylindrical portion which can serve as a protective covering for the food processing blades of the food processing attachment.

The apparatus and method the present invention can be utilized in order to perform a food processing operation on food or food ingredients which are located in a cooking pot, a cooking container, a cooking utensil, or any other device or item. In this regard, the apparatus can be utilized with or in connection with a cooking pot, a cooking container, a cooking utensil, or any other device or item in or with which the food or food ingredients were cooked, so as to dispense with the need of having to transfer the food or food ingredients into a separate food processor or food processing container. In this regard, the apparatus can be utilized in order to avoid or to dispense transferring food, food ingredients, and any cooking liquids, from and between containers, thereby preventing any spills, messes, or waste, and/or dispensing with the need to handle hot food, food ingredients, or cooking liquids, and/or dispensing with the need to deal with any of the inconveniences or hazards associated with same.

Once food or food ingredients have been cooked to the desired manner, the respective cooking pot, a cooking container, a cooking utensil, or any other device or item, can be removed from the stove or oven, or other cooking equipment, or cooking environment, and can be placed on a stand, on a platform, or on any other suitable structure away from the cooking equipment and/or at any other safe and convenient place for using the apparatus. Thereafter, the lid, if not yet removed, can be removed. The food or food ingredients in the cooking pot, cooking container, cooking utensil, or any other device or item, for example, can be, or can include, one or more vegetables and the liquid in which they were cooked. Thereafter, the plate, which can be previously lowered down along the cylindrical housing portion can be centered over and can be placed on the top of the cooking pot, a cooking container, a cooking utensil, or any other device or item. In this manner, the food processing blades of the food processing attachment can be initially positioned above the food or food ingredients as shown. Such a procedure can prevent damage to the food processing blades.

Thereafter, the user or operator can select a slow speed of operation and can activate the apparatus. Once the apparatus has been activated and the processing blades are rotating, the user or operator can press downwardly on the handle in order to "cut through" food or food ingredients and can continue doing so until the spacer portion of the food processing attachment reaches the bottom of the respective cooking pot, cooking container, cooking utensil, or any other device or item. Once the spacer portion has reached the bottom of the respective cooking pot, cooking container, cooking utensil, or any other device or item, the apparatus can be in its preferred "in use" position. As noted herein, the food processing attachment can rotate freely about the spacer portion. Thereafter, the user or operator can commence using the apparatus by selecting any speed, mode, or manner, of use in order to perform the desired food processing operation. The user or operator can operate the apparatus so as to maintain the spacer portion against the bottom of the respective cooking pot, cooking container, cooking utensil, or any other device or item, until the food processing operation is completed.

The user or operator can also move the handle up and/or down, so as to move the cylindrical housing portion up or down vis-à-vis the plate, in any appropriate manner or fashion so as to elevate and lower the food processing blades in and during the food processing operation while maintaining the plate on the top of the respective cooking pot, cooking container, cooking utensil, or any other device or item. Once the food processing operation has been completed, the apparatus can be turned off and the plate and the remainder of the apparatus can be removed from the respective cooking pot, cooking container, cooking utensil, or any other device or item. The apparatus of the present invention can also be utilized in order to process raw food or raw food ingredients, uncooked food or uncooked food ingredients, or partially cooked food or partially cooked food ingredients.

In another preferred embodiment, the plate can be designed to have sides extending from the end of same and extending downwardly. At least one benefit of having such sides is to provide for a greater level of containment of the contents of the food, food ingredients, or cooking liquid within the respective cooking pot, cooking container, cooking utensil, or any other device or item.

The plate can also be designed to have at least two flanges along the circumference of same and the respective cooking pot, cooking container, cooking utensil, or any other device or item, can either be deigned to have appropriate mating elements for mating with the flanges, or a circular fitting having the mating elements can be placed on and/or around the respective cooking pot, cooking container, cooking utensil, or any other device or item, and the flanges of the plate can be mated with same so as to secure the plate to the respective cooking pot, cooking container, cooking utensil, or any other device or item.

The plate and food processing attachment, and/or the food processing blades, can be provided in various sizes, so that the apparatus can be adapted for use with any size, shape, or type of cooking pot, cooking container, cooking utensil, or any other device or item. The food processing attachments and their associated food processing blades, rotating rods, cylindrical housing portions, and/or plates, regardless of their type, kind, shape, or size, can be interchangeable so that the apparatus can be adapted for any kind or type of use and/or with any size, type, or kind, of cooking pot, cooking container, cooking utensil, or any other device or item.

The apparatus can also be utilized for food processing attachments having any number, types, or kinds, of food processing blades. In this regard, two, three, four, five, six, or any other number or food processing blades can be included on a food processing attachment. The apparatus can also be utilized in conjunction with a food processing attachment which contains beater attachments instead of the food processing blades. The apparatus can also be utilized in conjunction with a food processing attachment which contains a whisk attachment instead of the food processing blades. The apparatus can also be utilized in conjunction with a food processing attachment which contains a blender attachment instead of the food processing blades. The ability to raise and lower the cylindrical housing portion vis-à-vis the plate can easily facilitate the use of the apparatus of the present invention with or in connection with many different types or kinds of food processing attachments.

The apparatus of the present invention can be utilized in connection with a cylindrical housing portion assembly and a rotating rod assembly which can be compressible or which can be adjustable lengthwise. The apparatus can be equipped with the cylindrical housing portion assembly and the rotating rod assembly which can be designed and/or which can be constructed to be compressible so as to be shortened lengthwise so as to shorten the effective length of the cylindrical housing portion assembly and the rotating rod assembly in order to position the main housing portion against the top side of the plate in order to facilitate use of the apparatus with any size, type, or kind, of cooking pot, a cooking container, a cooking utensil, or any other device or item which can be utilized for cooking, or for any other reason or purpose.

The apparatus and method of the present invention can be utilized to perform any type or kind of food processing operations, activities, and/or functions, with or involving any types or kinds of foods and/or food ingredients. The apparatus and method of the present invention can also be utilized to perform any type or kind of food processing operations, activities, and/or functions, with or involving any types or kinds of hot or cold foods and/or food ingredients.

The apparatus and method of the present invention can also be utilized to perform any type or kind of food processing operations, activities, and/or functions, including, but not limited to, foods or food ingredients which have been prepared by the simultaneous boiling and steam of same, the boiling of same, or the steaming of same, prior to processing same using the apparatus of the present invention.

Further, the use of an adjustable cylindrical housing portion and any adjustable rotating rod assembly in connection with the apparatus of the present invention can also allow a user or operator to use the apparatus in connection with different sized of cooking pots, cooking containers, cooking utensils, or any other devices or items.

Any type, kind, shape, or size, of plate can be utilized in connection with the apparatus of the present invention so as to allow a user or operator to use different sizes of cooking pots, cooking containers, cooking utensils, or any other devices or items.

Any number, kind, type, shape, or size, of plates, cylindrical housing portions, adjustable cylindrical housing portions, rotating rods, adjustable rotating rod assemblies, or adjustable rotating rod assemblies, or food processing attachments, can be utilized with the apparatus of the present invention in an interchangeable manner or fashion for any type or kind, or application, of use.

The plate can be secured to the respective cooking pot, cooking container, cooking utensil, or any other device or item, using any suitable connecting devices, elements, springs loaded devices, clips, or any other connectors. For example, a circular fitting which can have flanges which can correspond to flanges of the plate or which can have horizontally extending edges, can be secured to the top edge of the respective cooking pot, cooking container, cooking utensil, or any other device or item. Once the apparatus is placed on the top of the respective cooking pot, cooking container, cooking utensil, or any other device or item, the edge of the plate, or a flange (if utilized), can then be secured to the horizontally extending edge, or a flange (if utilized), of the circular fitting using any suitable connecting element, including, but not limited to, a C-clamped connector, a spring-loaded clip or connector, or any other suitable device.

The apparatus of the present invention can also be designed so that the main housing can be secured at any desired height above the plate during use. To facilitate securing the main housing at any desired height above the plate, the cylindrical housing portion can be designed to have a longitudinal strip of material, or any number of longitudinal strips of material, which can be made of rubber or any other suitable material, and which can run lengthwise along and down the cylindrical housing portion. A height adjuster element, which can be placed between the main housing and the plate during assembly for that particular use, can be equipped with a bolt and an associated turning or rotating portion or handle which can be turned in order to turn the bolt so as to cause the bolt to be moved into a contact with the longitudinal strip of material, so as to hold the cylindrical housing portion and the main housing in a non-moveable and/or stationary contact with each other and at a desired elevation above the plate and, correspondingly, to maintain the food processing attachment at a desired position within the respective cooking pot, cooking container, cooking utensil, or any other device or item. In this manner, if a particular height adjustment is desired for the main housing to be secured above the plate, or if a particular position of the food processing attachment within the respective cooking pot, cooking container, cooking utensil, is desired, the apparatus of the present invention can be utilized to effectuate same.

The apparatus of the present invention can be utilized in order to perform any food processing operations, food blending operations, food whisking operations or food whipping operations, or food beating operations, or any other operations on or with any types or kinds of foods, food ingredients, or liquids.

The apparatus of the present invention can also be designed, and can be utilized, to perform any number of food processing and/or food processing-related operations and/or modes of operation, which can include, but which are not limited to, chopping, mixing, blending, liquefying, grating, beating, whipping. whisking, stirring, pureeing, pulsing, ice crushing, crumbing, extracting, preparing dough, preparing smoothies, performing high speed operation, and/or performing food processing and/or any other food processing-related, operations on, with, or regarding any of the various types or kinds or food(s), food ingredient(s), or liquids(s), with which the apparatus can be utilized.

The apparatus of the present invention can also be programmed to perform any of the food processing and/or food processing-related operations or functions described herein. For example, a user need only select the desired food processing and/or food processing-related operation or function and then start the apparatus. The apparatus of the present invention can also be programmed to sequence through a number of different operations or functions. As and for an example, the apparatus can, upon being selected to do so, perform a chopping operation, a mixing operation, a blending operation, and a liquefying operation, on any food, food ingredient(s), or liquid(s). The apparatus of the present invention can be programmed, or pre-programmed, to perform any of the herein-described operations or functions in any desired sequence for any desired period of time.

As and for an illustrative, but not limiting, example, when preparing a soup base, the apparatus of the present invention can be selected to chop the ingredients being processed for 30 seconds, then mix same for 30 seconds, then blend same for 30 seconds, and then liquefy same for 30 seconds before ceasing operation. As and for another illustrative, but not limiting, example, when preparing a smoothie, the apparatus 100 can be selected to crush ice for 30 seconds, chop the ingredients being processed for 30 seconds, then mix same for 30 seconds, then blend same for 30 seconds, and then liquefy same for 30 seconds before ceasing operation.

The apparatus of the present invention can also be designed, or can be preprogrammed, with any number of food processing operational or functional combinational sequences as well as the timed sequences for each operation or function utilized. The apparatus of the present invention can also be programmed by a user to perform any operations or functions in any sequential order or manner and/or for any desired time period(s).

The apparatus can include a central processing unit (CPU) which can process any data, information, and/or instructions, for activating, de-activating, enabling, disabling, and/or controlling an operation of the apparatus. The apparatus can also include a random access memory (RAM) for storing any data and/or information which can be utilized by the central CPU. The apparatus can also include a read only memory (ROM) for storing any data and/or information which can be utilized by the central CPU. Both the RAM and the ROM can be connected to the CPU. The CPU can also be connected to the motor which is housed in the main housing portion. The CPU can controls the operation of the motor. The apparatus can also include a database which can store any data, information, and/or instructions which can be utilized by the CPU. The CPU, the RAM, the ROM, the motor, and the database, can all be housed within the main housing portion. An operating switch can also be connected to the CPU, an On/Off Switch can also be connected to the CPU, and the control panel, which can include a user input device and a display device, can also be connected to the CPU.

A user can select the mode of operation or the modes of operation of the apparatus via the control panel, and can activate the apparatus via the operating switch and/or the On/Off Switch so as to operate the apparatus as desired. The apparatus and, in particular, the CPU can be programmed to control the mode(s) of operation of the apparatus, the motor, the food processing attachment, and/or the plurality of food processing blades, as well as to control the operating of speed of the apparatus, the motor, the food processing attachment, and/or the food processing blades, so as to utilize the apparatus in any of the herein-described, or any other suitable, modes of operation and/or any sequential modes of operation.

The CPU can be programmed with various modes of operation(s), and any times for operating same, including, for example, but not limited to, motor speed(s) and time(s) of operation, for or regarding each mode of operation, for performing each of a wide variety of chopping, mixing, blending, liquefying, grating, beating, whipping. whisking, stirring, pureeing, pulsing, ice crushing, crumbing, extracting, performing dough preparation, preparing smoothies, performing high speed operations, and/or performing food processing and/or any other food processing-related, modes of operations.

The apparatus of the present invention can be utilized with, or as a component of, a cooking apparatus. The cooking apparatus can include a cooking pot which can be equipped to operate as a conventional stovetop cooking pot and/or as a slow cooker, a lower lid assembly, which can be attached to the cooking pot via any suitable flanges or connectors. The apparatus of the present invention can also be secured to the top portion of the lower lid assembly via the plate of the apparatus and any flanges or connectors. The lower lid assembly can be designed to have sufficiently sized opening so as to facilitate the placement of a portion of the apparatus therein and therethrough so as to attach same onto the cooking pot.

The cooking apparatus can also include a control panel which contains the necessary switches, control knobs, input keypad, and display device, needed to operating the cooking pot of the cooking apparatus. The cooking apparatus can also include a line cord for connecting the cooking pot to an AC (alternating current) power source. Either or both of the cooking pot and the apparatus can also be battery powered.

The cooking apparatus can also be utilized in connection with a one-piece lid or with a two-piece lid. The two-piece lid can be utilized in conjunction with the apparatus of the present invention.

The apparatus of the present invention can also be utilized with interchangeable plates which can have different sizes or diameters so as to accommodate and/or so as to facilitate utilizing the plate to cover the entire open top of the pot or the cooking pot and in order to facilitate utilizing the plate in conjunction with a two-piece lid assembly configuration of the cooking apparatus.

The cooking pot can include an inner cooking pot which can be made of any appropriate material, such as for example, stainless steel or any suitable metal, metal alloy, or any other commercially know cooking utensil material. The inner cooking pot can be round in shape like a conventional cooking pot. The inner cooking pot can also contain, on the inner side walls thereof, measuring lines or measurement markings for use by a user in filling food, food ingredients, or liquids, into the inner cooking pot in desired proportions.

The cooking pot can also contain an electric cooking or heating element which can be located at the bottom end portion of the cooking pot and beneath, and in contact, with the bottom of the inner cooking pot so as to provide for maximum heat transfer to the inner cooking pot. The inner cooking port can be situated directly on top of the heating element. The heating element can be sized so as to be round and so as to have a diameter which is at least somewhat larger then the diameter of the bottom portion of the inner cooking pot. The heating element can also be sized so as to be round and so as to have a diameter equal to, or smaller than, the diameter of the inner cooking pot. **

The heating element can be utilized to perform stovetop-like cooking with the cooking pot. The heating element can be of the same type or kind as those heating elements utilized in electric stoves and electric stove burners, which can be found in homes and/or in commercial food preparation establishments. In this regard, the heating element can be the same type of kind of heating elements as those used in electric stove burners. The heating element can also be designed and utilized to perform stovetop or stovetop-like cooking tasks, with heating temperatures at least the same as the maximum cooking temperatures of conventional household electric stove burners or gas stove burners or commercial electric stove burners or gas stove burners. In this regard, the cooking pot is not limited to performing only slow cooking tasks.

The cooking pot can also include a wrap-around jacket heating element which can be placed around and against the inner cooking pot. The jacket heating element can extend from the top portion of the inner cooking pot to the bottom of the heating element beneath same, or can extend any distance along the height of the cooking pot. The jacket heating element can be designed so as to provide the heating capabilities of heating elements found in conventional slow cookers as well as to provide the heating capabilities found in electric stove burners.

The cooking pot can also contain insulating material or insulation which can be provided between the heating element and the inner side of the exterior bottom wall portion of the housing of the cooking pot, and which is provided between the jacket heating element and the inner side of the exterior side wall portion of the housing of the cooking pot. The insulation can be designed to completely contain the heat produced by the heating element and the jacket heating element. The housing of the cooking pot can be made of any suitable material(s) which are typically used in manufacturing slow cookers and/or other countertop cooking appliances and devices. For example, the exterior wall of the housing of the cooking pot can be made of any porcelain material or any other non-heat conducting material or materials.

The cooking pot can include a central processing unit (CPU) which can process any data, information, and/or instructions, for activating, de-activating, enabling, disabling, and/or controlling an operation of the cooking pot. The cooking pot 420 can also include a random access memory (RAM) for storing any data and/or information which can be utilized by the central CPU. The cooking pot can also include a read only memory (ROM) for storing any data and/or information which can be utilized by the central CPU. Both the RAM and the ROM can be connected to the CPU.

The CPU can also be connected to the heating element and can control the operation of same. The CPU can also be connected to the jacket heating element and can control the operation of same. The cooking pot can also include a database which can store any data, information, and/or instructions which can be utilized by the CPU. The CPU, the RAM, the ROM, the heating element, the jacket heating element, and the database are all housed within the housing of the cooking pot. An operating switch, which can be mounted on the exterior of the cooking pot can also be connected to the CPU. An On/Off Switch can also be connected to the CPU. A control panel, which can contain a user input device(s) and a display device, can also be connected to the CPU.

A user can select the mode of operation or the modes of operation of the cooking pot via the control panel, and can activate the cooking pot via the operating switch and/or the On/Off Switch so as to operate the cooking pot as desired. The cooking pot and, in particular, the CPU can be programmed to control the mode(s) of operation of the cooking pot, the heating element, and the jacket heating element, as well as to control the operating temperature(s) of the cooking pot, so as to utilize the cooking pot in any desired and/or suitable modes of operation or in any desired sequential modes of operation.

The CPU can be programmed with various cooking modes of operation(s), and any cooking temperatures and corresponding cooking times corresponding thereto, including, for example, but not limited to, cooking temperatures and times of and for the heating element and/or the jacket heating element for performing low temperature cooking, medium temperature cooking, high temperature cooking, slow cooking, stovetop cooking, or food warming, and/or any other cooking operations which can be performed by the cooking pot. The CPU can also be preprogrammed and/or programmed for cooking certain foods, food ingredients, and/or liquids, and for performing automatic sequential cooking operations in cooking foods, food ingredients, and/ or liquids. In this regard, the CPU can be preprogrammed or programmed with predetermined operating mode settings, as well as any corresponding cooking temperatures or cooking temperature settings and any cooking times allocated for each of the cooking temperature settings. The CPU can also be preprogrammed or can be programmed with, and so as to automatically control, various types of kinds of cooking modes of operation in order to effectuate various cooking techniques.

The apparatus of the present invention and the cooking pot 420 can be utilized in conjunction with one another in order to cook or prepare various food(s), food ingredient(s), or liquids, with and using the cooking pot, and to thereafter process the food(s), the food ingredient(s), or the liquid(s), with the apparatus of the present invention. The apparatus of the present invention can also be attached to the cooking pot during any and/or all cooking operations performed by the cooking pot. The apparatus of the present invention can also be attached to the cooking pot after and/or all cooking operations by the cooking pot 420 have been completed.

DESCRIPTION OF THE PREFERRED EMBODIMENTS

Figure 1:
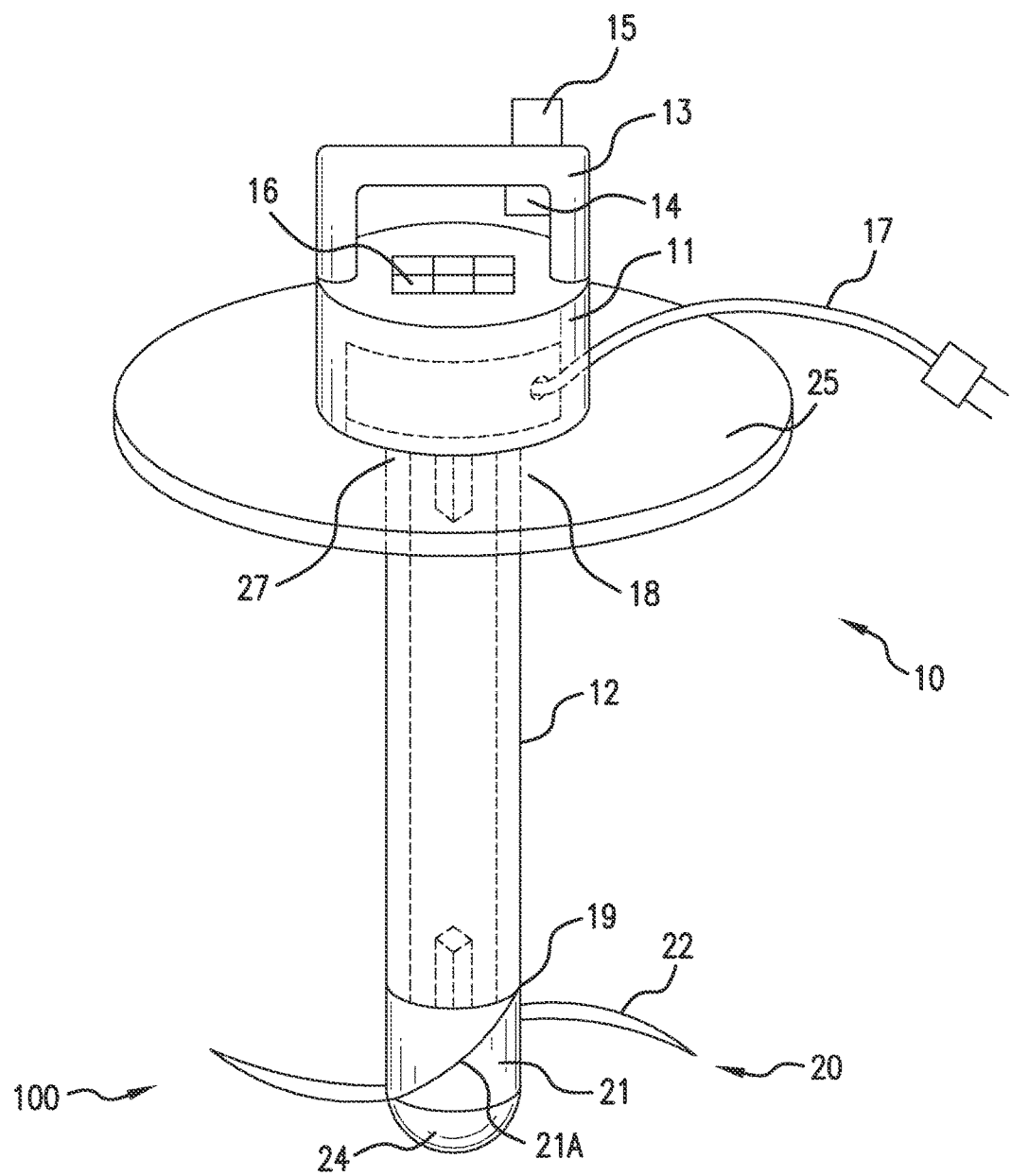
FIG. 1 illustrates a preferred embodiment of the apparatus of the present invention, in a three-dimensional perspective.

The present invention pertains to a food processing apparatus and method and, in particular, to a food processing apparatus and method which can be positioned on or over a top end portion, or an open end portion, of a cooking pot, a cooking container, a cooking utensil, or any other device or item which can be utilized for cooking, processing, or preparing, foods or food ingredients.

The present invention provides a food processing apparatus which can be utilized in connection with, or along with, any suitable cooking pot, cooking container, cooking utensil, or any other device or item which can be utilized for cooking, processing, or preparing, foods or food ingredients. The present invention also dispenses with the need to move or transfer food(s) or food ingredients from a cooking pot, cooking container, cooking utensil, or any other device or item which can be utilized for cooking, processing, or preparing, foods or food ingredients to another cooking pot, cooking container, cooking utensil, or any other device or item. The present invention can also be placed or situated on a top end portion or a cooking pot, cooking container, cooking utensil, or any other device or item, thereby dispensing with the need to be held or supported during use by a user or operator.

As used herein, the terms "cooking pot", "cooking container", or "cooking utensil", or the plural of same, means or refers to any pot, pan, skillet, tray, container, utensil, mixing bowl, slow cooker, Crock Pot, steamer, or any other device, item, or equipment, which can be used to cook, boil, steam, broil, simultaneously boil and steam, process, or prepare, any type of kind of food or food ingredient. In a preferred embodiment, any of the herein-described cooking pots, cooking containers, cooking utensils, or other devices or items, can be made or manufactured of, from, or with, or can include, steel, metal, stainless steel, glass, plastic, or nonstick materials, or any combination of same, and/or can be designed to include measuring lines on the interior sides thereof, or on the exterior sides thereof when manufactured from glass, plastic, or any other suitable or appropriate clear, transparent, near transparent, or semi-transparent, materials. In a preferred embodiment, the herein-described cooking pots, cooking containers, cooking utensils, or other devices or items, can also be provided with, or have associated therewith, a stand, a platform, or a base made of appropriate material on which the respective cooking pots, cooking containers, cooking utensils, or other devices or items, can be placed or supported when being utilized in connection with the apparatus 100 of the present invention.

Applicant hereby incorporates by reference herein the subject matter and teachings of U.S. Provisional Patent Application Ser. No. 62/027,630, filed Jul. 22, 2014, and entitled "FOOD PROCESSING APPARATUS AND METHOD", the subject matter and teachings of which are hereby incorporated by reference herein in their entirety. Applicant also hereby incorporates by reference herein the subject matter and teachings of U.S. Provisional Patent Application Ser. No. 62/007,099, filed Jun. 3, 2014, and entitled "FOOD PROCESSING APPARATUS AND METHOD", the subject matter and teachings of which are hereby incorporated by reference herein in their entirety.

FIG. 1 illustrates a preferred embodiment of the apparatus of the present invention, which is designated generally by the reference numeral 100, in a three-dimensional perspective. With reference to FIG. 1, in a preferred embodiment, the apparatus 100 includes a housing 10 which includes a main housing portion 11 and a cylindrical housing portion 12, which is connected to or attached to the main housing portion 11. In a preferred embodiment, the cylindrical housing portion 12 is detachable from the main housing portion 11 in order to facilitate easy and convenient cleaning and/or sterilization of same. The apparatus 100, in a preferred embodiment, also includes, on the top portion of the main housing portion 11, which houses, among other components of the apparatus 100, the motor (not shown), a handle 13 which can be utilized to handle or maneuver the apparatus 100. In a preferred embodiment, the handle 13 can be attached to, or can be an integrated component of, the main housing portion 11.

In a preferred embodiment, the handle 13 includes an operating switch 14 which can be utilized by a user or operator to activate and/or control an operation of the apparatus 100. In a preferred embodiment, the handle 13 can also include an on/off switch 15 which can be used for activating and/or deactivating the apparatus 100. In a preferred embodiment, the handle 13 also includes a control panel 16 which can include an any one or more of an on/off switch or device, a speed selector switch or device, and/or an operating mode selector or device. In a preferred embodiment, the apparatus 100 can be designed to operate various food processing attachments, blending attachments, mixing attachments, whisking attachments, or any other suitable attachments at various selectable speeds and/or in various modes of operation, such as, for example, but not limited to, a food processing mode, a blending mode, a mixing mode, a beating mode, a whipping mode, a whisking mode, or any other food preparation mode of operation.

In a preferred embodiment, the apparatus 100 can be designed to operate in a chopping operating mode, a mixing operating mode, a blending operating mode, a liquefying operating mode, a grating operating mode, a beating operating mode, a whipping operating mode. a whisking operating mode, a stirring operating mode, a pureeing operating mode, a pulsing operating mode, an ice crushing operating mode, a crumbing operating mode, an extracting operating mode, a dough preparing operating mode, a smoothie preparing operating mode, a high speed operating mode, or any other food processing operating mode, and/or any other food processing-related operating mode. In a preferred embodiment, the apparatus 100 can also be designed, preprogrammed, or programmable, to perform any number of operating modes in a sequential manner.

In a preferred embodiment, the main housing portion also includes a power cord 17 which extends therefrom as shown. In a preferred embodiment, the power cord 17 can selected to have any appropriate or desired length and should be made of a suitable heat resistant material which can provide for safe use in high temperature environments or which can provide adequate safety when using the apparatus 100 in connection with high temperature cooking pots, cooking containers, cooking utensils, or any other devices or items found in a cooking environment.

In another preferred embodiment, the apparatus 100 can also be equipped to be battery powered, in addition to, or instead of, being utilized in connection with a plug in power cord.

With reference once again to FIG. 1, the cylindrical housing portion 12 includes an upper end portion 18 and a lower end portion 19. In a preferred embodiment, the cylindrical housing portion 12 is attached to or connected to the main housing portion 11 at the bottom side portion thereof as shown in FIG. 1. In a preferred embodiment, the apparatus 100 also includes a food processing attachment 20 which in a preferred embodiment, is attached to the apparatus 100 at the lower end portion of the cylindrical housing portion 12 as shown. In a preferred embodiment, the food processing attachment 20 includes a main body 21, a plurality of food processing blades 22 attached to the main body 21, and a mixing element 21A which, in a preferred embodiment, is formed in the main body 21 and which can be designed to facilitate mixing during the food processing process. In a preferred embodiment, the food processing attachment 20 can also include a spacer portion 24, about which the main body 21 and/or the remainder of the food processing attachment 20 can freely rotate, which spacer portion 24 can serve to elevate and to protect the food processing attachment components 21 and 21A, and/or the food processing blades 22, which are situated above same, from coming into contact with the bottom of a respective cooking pot, cooking container, cooking utensil, or any other device or item, in connection with which the apparatus 100 is being utilized. In this regard, in a preferred embodiment, the spacer portion 24 is rotatably connected to the main body 21 of the food processing attachment 20.

In a preferred embodiment, use of the spacer portion 24 in conjunction with the apparatus 100 of the present invention, or in connection with any type or kind of food processing attachment 20, can be optional or can be utilized as needed or desired in order to elevate and to protect the components of a respective food processing attachment 20 and/or any food processing blades or other processing elements, while also allowing the food processing attachment 20 to rotate freely about the spacer portion 24 and/or to rotate freely and without interference, obstruction, or resistance, during a use and/or an operation of the apparatus 100 of the present invention.

In a preferred embodiment, as well as in any and/or all of the embodiments described herein, the use of the spacer portion 24, or the use of any other spacer portion which can be utilized on or in connection with any other food processing attachment with which the apparatus 100 of the present invention can be utilized, can be optional, and/or the spacer portion 24, or any other spacer portion, can be rotatably connected with the main body 21 of the food processing attachment 20 and can be designed in any appropriate manner as long as the remaining components of the food processing attachment 20, the main body 21, the mixing element 21A, or any food processing blades 22, or any food processing elements, can rotate freely about the spacer portion 24 or other spacer portion while being elevated from the bottom of the respective cooking pot, cooking container, cooking utensil, or any other device or item, in connection with which the apparatus 100 is being utilized.

In this manner, the spacer portion 24 serves to elevate and to protect the remaining components of the food processing attachment 20 above and from the bottom of the respective cooking pot, cooking container, cooking utensil, or any other device or item, in connection with which the apparatus 100 is being utilized, while also allowing the remaining components of the food processing attachment 20, the main body 21, the mixing element 21A, or any food processing blades 22, or any food processing elements, to rotate freely about the spacer portion 24 any without interference, obstruction, or resistance, during a use and/or an operation of the apparatus 100 of the present invention.

In a preferred embodiment, the main housing portion 11 and the cylindrical housing portion 12 can be made, manufactured, or formed, of steel, stainless steel, plastic, heat treated plastic, composite material, or any other suitable or appropriate material or materials, or any combination of same.

In a preferred embodiment, the main housing portion 11 houses an electric motor (not shown). In a preferred embodiment, the electric motor is an alternating current (AC) motor which can be powered via the line cord 17. In another preferred embodiment, the apparatus 100 can also be battery powered and can be equipped with direct current (DC) motor. In still another preferred embodiment, the electric motor can also be either an AC motor or a DC motor and the apparatus 100 can be equipped with any DC-AC conversion circuitry or equipment or AC-DC conversion circuitry or equipment in order to facilitate use of the apparatus with any type or kind of motor and any available power source. In a preferred embodiment, the main housing portion also houses a control device or a controller and any attendant circuitry and/or equipment activating, de-activating, enabling, or disabling, or controlling and/or all operations and functions which can be performed by the apparatus 100.

In a preferred embodiment, the cylindrical housing portion 12 is a hollow cylinder which can house can accommodate a rotating rod, shaft, or element (not shown) which is utilized to drive an operation of the food processing attachment 20 and the food processing blades 22 or any other food processing attachments or devices which can be utilized in connection with the apparatus 100 of the present invention.

In a preferred embodiment, either or both of the main housing portion 11 and/or the cylindrical housing portion 12 can also house the drive mechanism (not shown) which is associated with the electric motor and the drive mechanism mating element (not shown) which is attached to or mated with the rotating rod, shaft, or element and which transfers the rotational energy or the rotating operation of the electric motor to the rotating rod, shaft, or element. In a preferred embodiment, either or both of the cylindrical housing portion 12 and/or the food processing attachment 20 can house the food processor drive mating element (not shown) which transfers the rotational energy or the rotating operation of the rotating rod, shaft, or element, to the food processor attachment 20 which causes the food processing blades 22 to rotate or spin during operation. In a preferred embodiment, the food processing blades 22 are fixedly attached or connected to the food processor attachment 20 so that the food processing blades 22 turn or rotate with the respective mechanical components of the food processor attachment 20.

With reference once again to FIG. 1, the food processor apparatus 100 also includes a plate 25 which, in a preferred embodiment, is of a circular shape. Although described as being of a circular shape, it is important to note that the plate 25 can take any shape depending on the nature of the use of the apparatus 100 and, therefore, the plate 25 can be square in shape, rectangular in shape, oval in shape, or can be designed to have any other shape. In a preferred embodiment, the plate has a hole or opening 27 in the center thereof through which the cylindrical housing portion 12 of the apparatus 100 can pass. In a preferred embodiment, the hole or opening 27 of the plate 25 is lined with a rubber gasket or a similar or like element (not shown) which can facilitate the placement and/or the movement of the cylindrical housing portion 12 within and/or through the hole or opening 27 as described herein.

In a preferred embodiment, the hole or opening 27 in the plate 25 can be designed or selected to be of sufficient diameter to allow the cylindrical housing portion 12 to be inserted therein and/or there through and, once the apparatus 100 is assembled for use, the plate 25 and the cylindrical housing portion 12 can be slideable or moveable about or relative to each other. For example, when the plate 25 of the apparatus 100 is fixed, the cylindrical housing portion 12 and slide back and forth as needed through the hole or opening 27 in the plate 25. Likewise, when the cylindrical housing portion 12 may be fixed in position, the plate 25 can be slideable or moveable along the cylindrical housing portion 12.

In a preferred embodiment, the plate 25 can serve any number of functions. For example, the plate 25, which can be of any suitable size, diameter, or thickness, can be selected to be large enough so at to cover the contents of, and/or so as to extend beyond the sides of, any type, kind, or size of cooking pot, cooking container, cooking utensil, or any other device or item which can be utilized in connection with the apparatus 100 of the present invention. The plate 25 can be utilized, among other tings, to secure or to stabilize the apparatus 100 on the top portion or on top of the respective cooking pot, cooking container, cooking utensil, or any other device or item, which can be utilized in connection with the apparatus 100 of the present invention, or the plate 25 can be utilized to prevent food from splattering from, or from or otherwise being expelled from, the respective cooking pot, cooking container, cooking utensil, or any other device or item, or can be utilized to provide a stable platform on or with which a user or operator can perform any food processing operation.

In a preferred embodiment, the apparatus 100 of the present invention, by virtue of the fact that the plate 25 and the cylindrical housing portion 12 can be slideable along each other or with regards to each other, can be utilized in connection with cooking pots, cooking containers, cooking utensils, or any other devices or items having any depth. Also, since a preferred embodiment use of the apparatus 100 of the present invention may involve placing the apparatus on top of a cooking pot, cooking container, cooking utensil, or other device or item, and lowering the food processing blades onto the food or food ingredients to be processed, the slidability of the plate 25 vis-a-vis the cylindrical housing portion 12 and vice versa, allows the user or operator to place the plate 25 over the cooking pot, cooking container, cooking utensil, or other device or item, so as to prevent food therein from splattering, and so as to allow the user or operator to activate the apparatus 100 in order to cut or slice through the food or food ingredients until the food processing attachment reaches the bottom of the cooking pot, cooking container, cooking utensil, or other device or item, at which time and/or position the apparatus 100 can be utilized to perform the desired food processing operation.

In the above-described manner, a controlled "cut through" of the food or food ingredients from the top of same down can be effectuated in order to bring or situate the food processing blades 22 to a preferred location near the bottom of the cooking pot, cooking container, cooking utensil, or other device or item. The slidability of the plate 25 vis-a-vis the cylindrical housing portion 12 and vice versa, also allows a user or operator to move the food processing blades up and down via the handle, to effectuate any desired food processing operation, while keeping the plate 25 in place to prevent splattering and/or to stabilize the apparatus 100 vis-a-vis the cooking pot, cooking container, cooking utensil, or other device or item.

Figure 2:
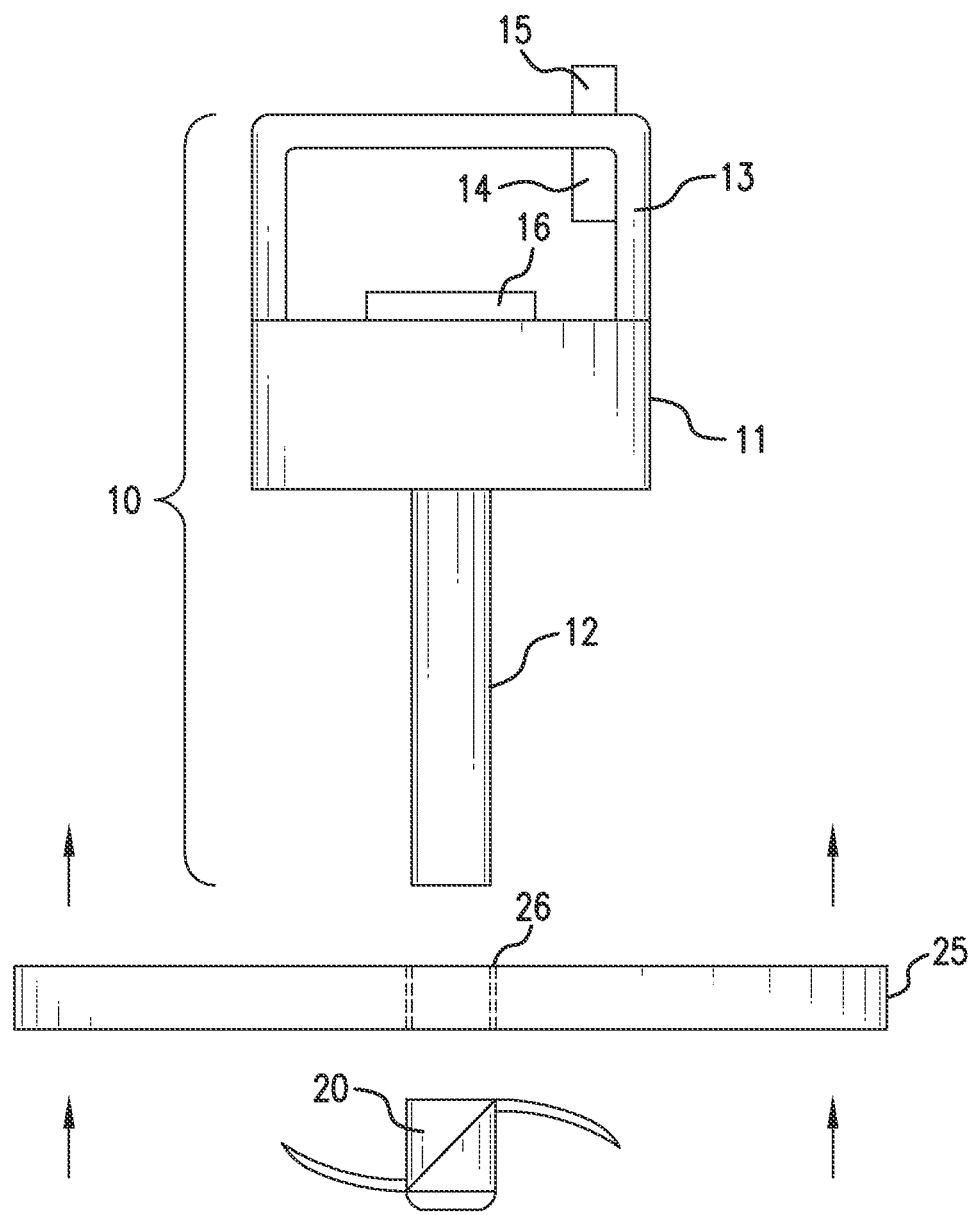
FIG. 2 illustrates a preferred embodiment of the apparatus of FIG. 1 showing a preferred order of assembly of the housing, the plate, and the food processing attachment of same.

FIG. 2 illustrates a preferred embodiment of the apparatus 100 of FIG. 1 showing a preferred order of assembly of the housing 10, the plate 25, and the food processing attachment 20. FIG. 2 illustrates the housing 10 including the main housing portion 11, the cylindrical housing portion 12, the handle 13, the operation switch 14, On/Off switch 15, control panel 16, plate 25, rubber gasket or a similar or like element 26 (hereinafter "gasket 26"). and the food processing attachment 20 containing food processing blades 22.

Figure 3:
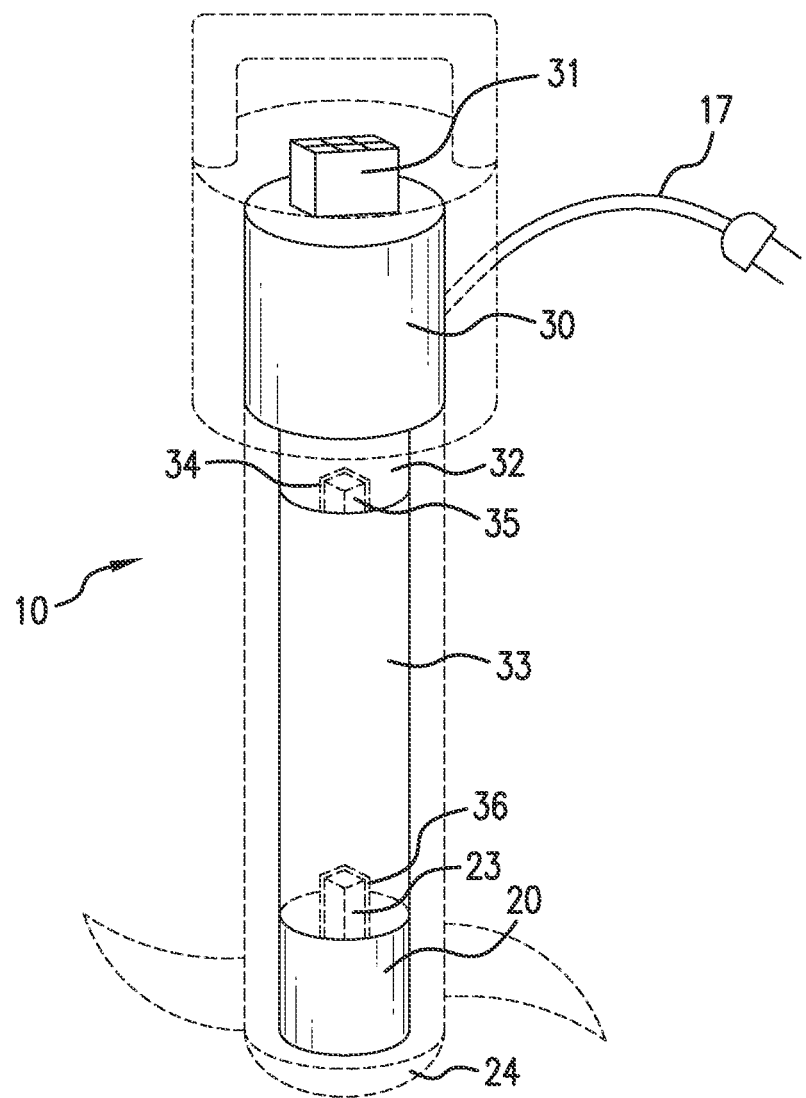
FIG. 3 illustrates the internal components of housing and food processor attachment of the apparatus of FIG. 1.

FIG. 3 illustrates the internal components of housing 10 and food processor attachment 20 with the outer components of the apparatus shown in dashed lines. FIG. 3 illustrates the electric motor 30, the control circuitry or controller 31 which is in electrical connection with the electric motor 30 so as to control an operation of same, the drive mechanism 32 which is mechanically connected to the electric motor 30 and which transfers the rotational energy of the electric motor 30 to the rotating rod, shaft, or element 33 (hereinafter "the rotating rod 33). The drive mechanism 32 and the rotating rod 33, in a preferred embodiment, are connected and secured together using suitable respective male and female connecting elements. For example, in a preferred embodiment, the drive mechanism 32 can include, at the top portion of same and at the center thereof, a female connector section 34 which can receive a male connector section 35 located at the top end portion of the rotating rod 33 and centrally positioned thereon.

In a preferred embodiment, the rotating rod 33 can have a male connector section 35 which can be secured in place in a female connector section 34 of the drive mechanism 32 and the rotating rod 33 can be secured with the drive mechanism 32 by using any suitable or appropriate securing elements, devices, or means, which are known by those persons skilled in the art for securing such connections. In a preferred embodiment, the respective connector sections 34 and 35 can be of such a respective and corresponding shape(s) so as to ensure that the rotational energy of the drive mechanism 32 is transferred to the rotating rod 33 in a complete a manner as possible. In this regard, in a preferred embodiment, for example, the female connector section 34 can have an opening which is square in shape, as shown, while the male connector section 35 can also be square in shape in order to mate with the female connector 34.

With reference once again to FIG. 3, the rotating rod 33 and the food processing attachment 20, in a preferred embodiment, are connected and secured together using suitable respective male and female connecting elements. For example, in a preferred embodiment, the rotating rod 33 can include, at the bottom portion of same and at the center thereof, a female connector section 36 which can receive a male connector section 23 located at the top end portion of the food processing attachment 20 and centrally positioned thereon. In a preferred embodiment, the male connector section 23 of the food processing attachment 20 can be received into and can be secured in place in and female connector section 36 of the rotating rod 33 can the food processor attachment 20 can be secured with the rotating rod 33 by using any suitable or appropriate securing elements, devices, or means, which are known by those persons skilled in the art for securing such connections.

In a preferred embodiment, the respective connector sections 36 and 23 can be of such a respective and corresponding shape(s) so as to ensure that the rotational energy of the rotating rod 33 is transferred to the food processing attachment 20 in a complete a manner as possible. In this regard, in a preferred embodiment, for example, the female connector section 36 can have an opening which is square in shape, as shown, while the male connector section 23 can also be square in shape in order to mate with the female connector 36.

Although square shapes are described herein as being utilized in the design and/or selection of the various connector sections 34, 35, 36, and 23, it is important to note that, in the preferred embodiment, any shapes can be utilized in the design and selection of these respective connectors. For example, the various connector sections can be three-sided, four sided and rectangular, five-sided, six-sided, or have any number of sides, or can be square, rectangular, triangular, or can be, or can have, any appropriate or desired shape.

In a preferred embodiment, the food processing attachment 20, the plate 25, the cylindrical housing portion 12, the rotating rod 33, and/or any other components of the apparatus 100 can be easily disassembled from the main housing portion 11 so that they can be cleaned and/or sterilized after use and easily reassembled for future use.

Figure 4:
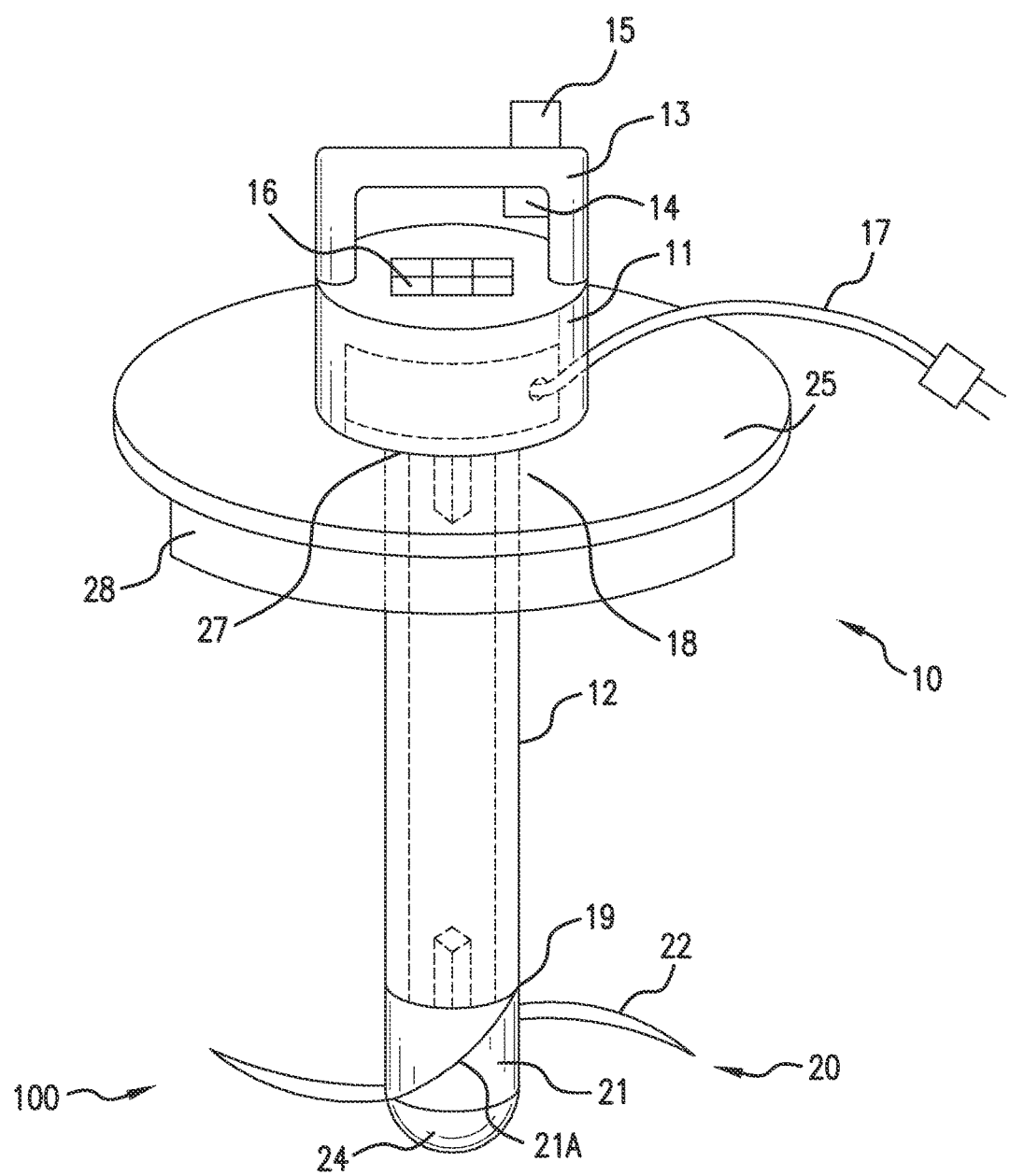
FIG. 4 illustrates another preferred embodiment of the plate which can be utilized in connection with the apparatus of the present invention.
Figure 5:
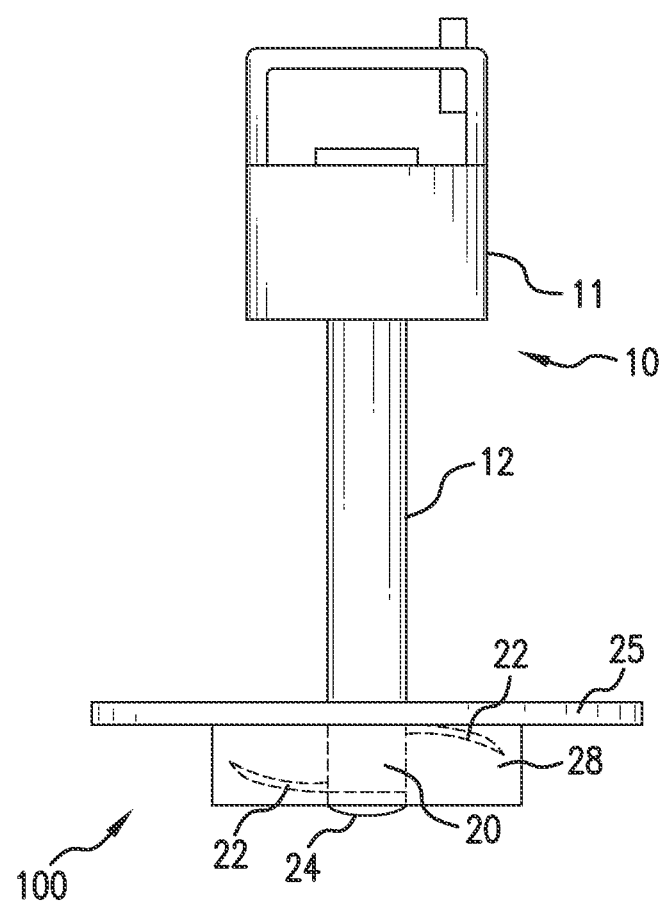
FIG. 5 illustrates a preferred embodiment illustration of the how the plate of FIG. 4 can be utilized to provide protection for the food processing attachment and/or food processing blades of same.

In another preferred embodiment of the present invention, the plate 25 can include on the lower side portion of same, a cylindrical portion which can serve as a protective covering for the food processing blades 22 of the food processing attachment 20. FIG. 4 illustrates another preferred embodiment of the plate 25 which can be utilized in connection with the apparatus 100 of the present invention. With reference to FIG. 4, the plate 25 includes on the lower side of same, a hollow cylindrical portion or a hollow cylinder 28 (hereinafter "cylinder 28"). In a preferred embodiment, cylinder 28 should have an interior diameter which is larger that the diameter of the food processing blades 22 and an interior vertical height which is larger that the height of the food processing attachment 20 so that, when the apparatus 100 is not in use, the plate 25 may be lowered downwardly along the cylindrical housing portion 12 until the cylinder 28 fully covers or encompasses the food processing attachment 20 and the food processing blades of same. FIG. 5 illustrates a preferred embodiment illustration of the how the plate 25 of FIG. 4 can be utilized to provide protection for the food processing attachment 20 and/or the food processing blades of same.

In a preferred embodiment, the apparatus 100 and method the present invention can be utilized in order to perform a food processing operation on food or food ingredients which are located in a cooking pot, a cooking container, a cooking utensil, or any other device or item. In this regard, in a preferred embodiment, the apparatus 100 can be utilized with or in connection with the same a cooking pot, a cooking container, a cooking utensil, or any other device or item in or with which the food or food ingredients were cooked, so as to dispense with the need of having to transfer the food or food ingredients into a separate food processor or food processing container. In this regard, the apparatus 100 can be utilized in order to avoid or to dispense transferring food, food ingredients, and any cooking liquids, from and between containers, thereby preventing any spills, messes, or waste, and/or dispensing with the need to handle hot food, food ingredients, or cooking liquids, and/or dispensing with the need to deal with any of the inconveniences or hazards associated with same.

Figure 6A:
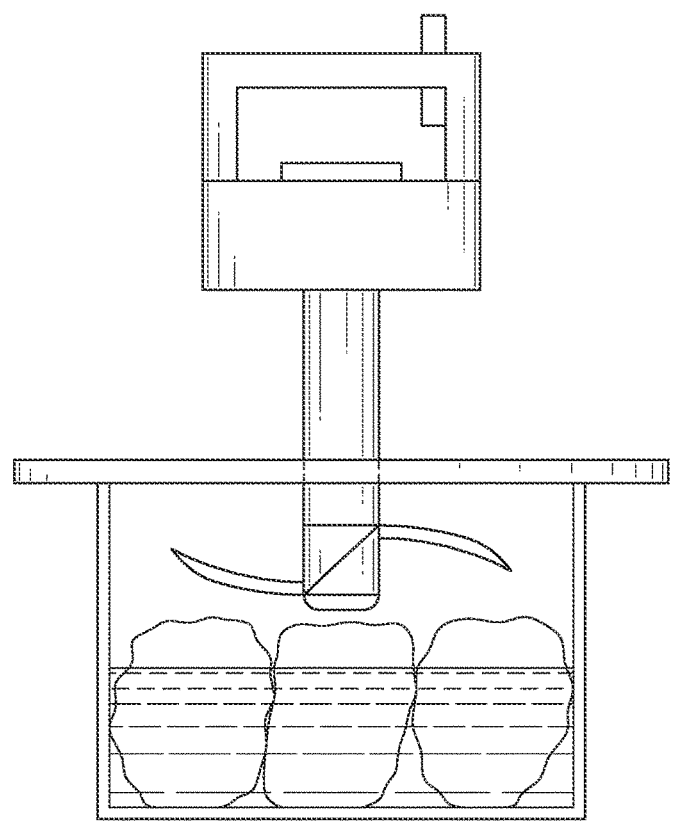
FIGS. 6A and 6B illustrate a preferred embodiment method for using the apparatus of the present invention.
Figure 6B:
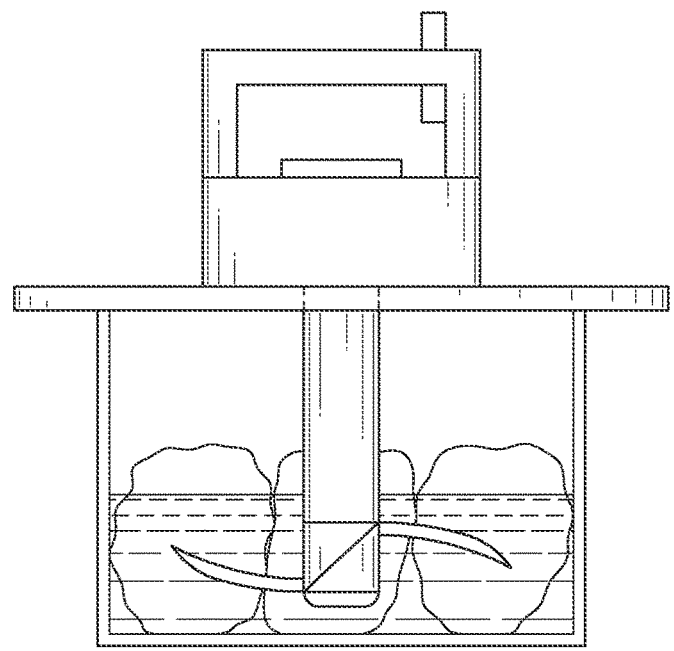

FIGS. 6A and 6B illustrate a preferred embodiment method for using the apparatus 100 of the present invention. Once the food or food ingredients have been cooked in or to the desired manner, the respective a cooking pot, a cooking container, a cooking utensil, or any other device or item, can be removed from the stove or over, or other cooking equipment, and can be placed on a stand, on a platform, or on any other suitable structure away from the cooking equipment and/or at any other safe and convenient place for using the apparatus 100. Thereafter, the lid, if not yet removed, can be removed. In a preferred embodiment, the food or food ingredients in the cooking pot, cooking container, cooking utensil, or any other device or item, for example, can be, or can include, one or more vegetables and the liquid in which they were cooked. Thereafter, in a preferred embodiment, the plate 25, which can be previously lowered down along the cylindrical housing portion 12 as shown in FIG. 6A, can be centered over and can be placed on the top of the cooking pot, a cooking container, a cooking utensil, or any other device or item, as shown in FIG. 6A. In this manner, the food processing blades 22 of the food processing attachment 20 can be initially positioned above the food or food ingredients as shown. This procedure can prevent damage to the food processing blades 22.

Thereafter, the user or operator can select a slow speed of operation and can activate the apparatus 100. Once the apparatus 100 has been activated and the processing blades 22 are rotating, the user or operator can press downwardly on the handle 13 in order to "cut through" food or food ingredients and can continue doing so until the spacer portion 24 of the food processing attachment 20 reaches the bottom of the respective cooking pot, cooking container, cooking utensil, or any other device or item, as shown in FIG. 6B. As noted herein, the food processing attachment 20 can rotate freely about the spacer portion 24. Once the spacer portion 24 has reached the bottom of the respective cooking pot, cooking container, cooking utensil, or any other device or item, the apparatus 100 is in its preferred "in use" position. Thereafter, the user or operator can commence using the apparatus 100 by selecting any speed, mode, or manner, of use in order to perform the desired food processing operation. In a preferred embodiment, the user or operator can operate the apparatus 100 so as to maintain the spacer portion 24 against the bottom of the respective cooking pot, cooking container, cooking utensil, or any other device or item, until the food processing operation is completed. In another preferred embodiment, the user or operator can also move the handle 13 up and/or down, so as to move the cylindrical housing portion 12 up or down vis-à-vis the plate 25, in any appropriate manner or fashion so as to elevate and lower the food processing blades 22 in and during the food processing operation while maintaining the plate 25 on the top of the respective cooking pot, cooking container, cooking utensil, or any other device or item. Once the food processing operation has been completed, the apparatus 100 can be turned off and the plate 25 and the remainder of the apparatus 100 can be removed from the respective cooking pot, cooking container, cooking utensil, or any other device or item.

Although the preferred embodiment of FIGS. 6A and 6B has been described and illustrated as being used to process cooked food or cook food ingredients, it is important to not that the embodiment of FIGS. 6A and 6B can also be utilized in order to process raw food or raw food ingredients, uncooked food or uncooked food ingredients, or partially cooked food or partially cooked food ingredients. In this regard, in a preferred embodiment, as well as any of the embodiments described herein, the apparatus 100 and method of the present invention can be utilized to process raw, uncooked, partially cooked, or fully cooked, food or food ingredients.

Figure 7:
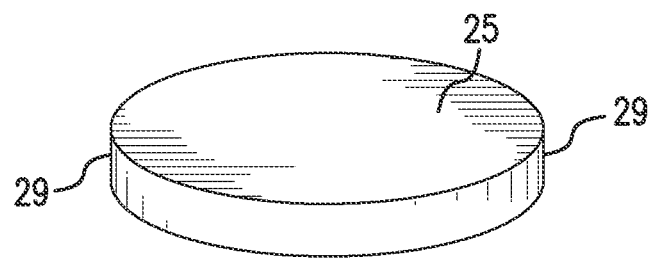
FIG. 7 illustrates another preferred embodiment of the plate which can be utilized in connection with the apparatus of the present invention.

In another preferred embodiment, the plate 25 can be designed to have sides extending from the end of same and extending downwardly. FIG. 7 illustrates another preferred embodiment of the plate 25 of FIG. 1 wherein the plate 25 has sides 29 extending downwardly as shown. At least one benefit of having sides 29 is to provide for a greater level of containment of the contents of the food, food ingredients, or cooking liquid within the respective cooking pot, cooking container, cooking utensil, or any other device or item.

Figure 8A:
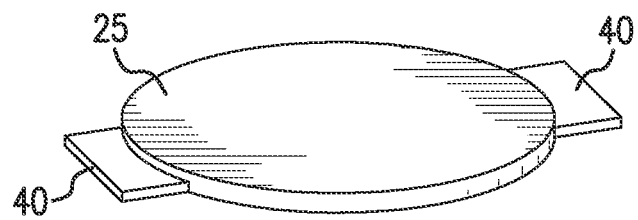
FIGS. 8A, 8B, and 8C, illustrate another preferred embodiment for using plate having flanges in connection with the apparatus of the present invention.
Figure 8B:
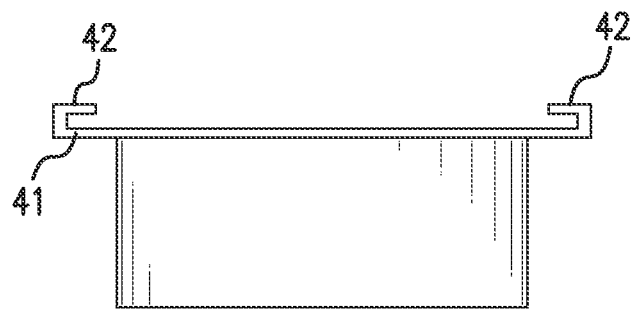
Figure 8C:
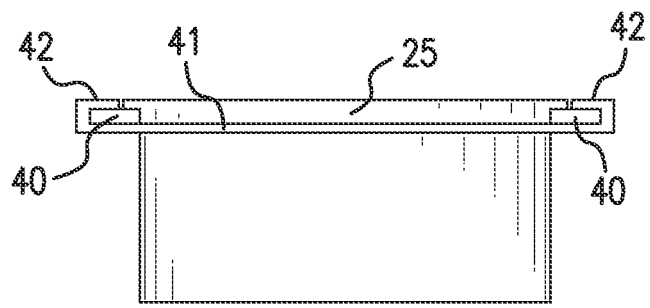

In another preferred embodiment, the plate 25 can be designed to have at least two flanges along the circumference of same and the respective cooking pot, cooking container, cooking utensil, or any other device or item, can either be designed to have appropriate mating elements for mating with the flanges, or a circular fitting having the mating elements can be placed on and/or around the respective cooking pot, cooking container, cooking utensil, or any other device or item, and the flanges of the plate 25 can be mated with same so as to secure the plate 25 to the respective cooking pot, cooking container, cooking utensil, or any other device or item. FIGS. 8A, 8B, and 8C, illustrate another preferred embodiment for using the plate 25 having flanges. FIG. 8A illustrates the plate 25 having flanges 40, FIG. 8B illustrates the respective cooking pot, cooking container, cooking utensil, or any other device or item, with the circular fitting 41 attached to same. In a preferred embodiment, the circular fitting 41 can be attached to the respective cooking pot, cooking container, cooking utensil, or any other device or item, at any time and in any appropriate manner. In another preferred embodiment, the circular fitting 41 can be formed integrally with the respective cooking pot, cooking container, cooking utensil, or any other device or item. With reference to FIG. 8B, the circular fitting 41 has mating elements 42, either attached thereto or integrally formed therein or therewith, as shown, for use in mating with the flanges 40 of the plate 25 as described herein. FIG. 8C illustrates the plate 25 secured to the respective cooking pot, cooking container, cooking utensil, or any other device or item, with the flanges 40 mated with the mating elements 42 of the circular fitting 41.

In a preferred embodiment, as well as any and/or all of the embodiments described herein, the plate 25 and food processing attachment 20, and/or the food processing blades 22, can be provided in various sizes, so that the apparatus 100 can be adapted for use with any size, shape, or type of cooking pot, cooking container, cooking utensil, or any other device or item. In another preferred embodiment, any of the food processing attachments 20 and their associated food processing blades 22, rotating rods 33, cylindrical housing portions 12, plates 25, regardless of their type, kind, shape, or size, can be interchangeable so that the apparatus 100 can be adapted for any kind or type of use and/or with any size, type, or kind, of cooking pot, cooking container, cooking utensil, or any other device or item.

Figure 9:
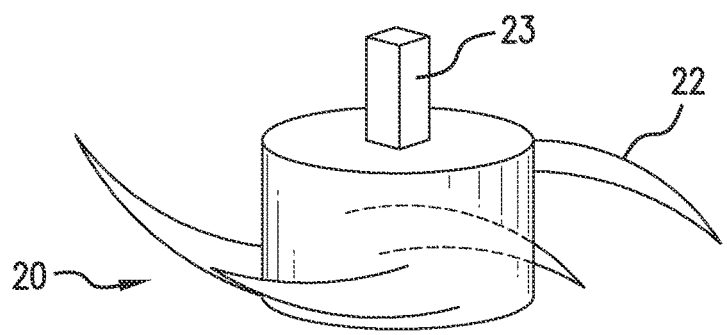
FIG. 9 illustrates another preferred embodiment of a food processing attachment which contains four food processing blades.

In another preferred embodiment, the apparatus 100 can also be utilized for food processing attachments having any number, types, or kinds, of food processing blades 22. In this regard, two, three, four, five, six, or any other number or food processing blades 22 can be included on a food processing attachment. FIG. 9 illustrates another preferred embodiment of a food processing attachment 20 which contains four food processing blades 22.

Figure 10:
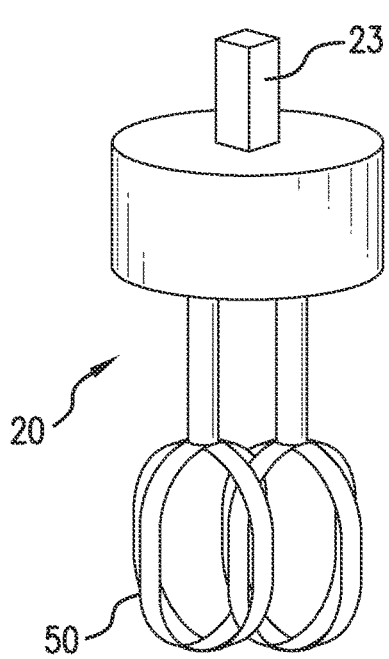
FIG. 10 illustrates another preferred embodiment of a food processing attachment which contains beater attachments.

In another preferred embodiment, the apparatus 100 can also be utilized in conjunction with a food processing attachment 20 which contains beater attachments 50, instead of the food processing blades 22. FIG. 10 illustrates another preferred embodiment of a food processing attachment 20 which contains beater attachments 50.

Figure 11:
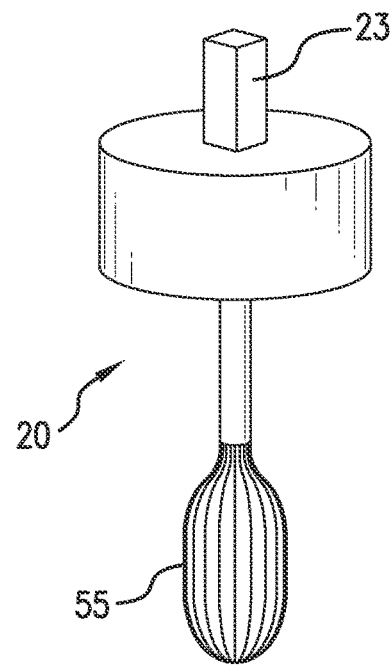
FIG. 11 illustrates another preferred embodiment of a food processing attachment which contains a whisk attachment.

In another preferred embodiment, the apparatus 100 can also be utilized in conjunction with a food processing attachment 20 which contains a whisk attachment 55 instead of the food processing blades 22. FIG. 11 illustrates another preferred embodiment of a food processing attachment 20 which contains a whisk attachment 55.

Figure 12:
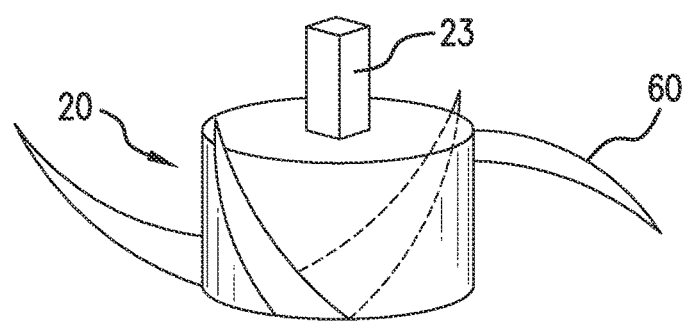
FIG. 12 illustrates another preferred embodiment of a food processing attachment which contains a blender attachment.

In another preferred embodiment, the apparatus 100 can also be utilized in conjunction with a food processing attachment 20 which contains a blender blades 60 instead of the food processing blades 22. FIG. 12 illustrates another preferred embodiment of a food processing attachment 20 which contains a blender attachment 60.

It can be easily seen that the ability to raise and lower the cylindrical housing portion 12 vis-à-vis the plate 25 can easily facilitate the use of the apparatus of the present invention with or in connection with many different types or kinds of food processing attachments.

In another preferred embodiment, the apparatus of the present invention can be utilized in connection with a cylindrical housing portion assembly and a rotating rod assembly which can be compressible or which can be adjustable lengthwise. In such a preferred embodiment, the apparatus can be equipped with the cylindrical housing portion assembly and the rotating rod assembly which can be designed and/or which can be constructed to be compressible so as to be shortened lengthwise. In this manner, the apparatus can be utilized so as to shorten the effective length of the cylindrical housing portion assembly and the rotating rod assembly in order to position the main housing portion against the top side of the plate, as is shown for example in FIG. 6B, in order to facilitate use of the apparatus with any size, type, or kind, of cooking pot, a cooking container, a cooking utensil, or any other device or item which can be utilized for cooking, or for any other reason or purpose.

Figure 13:
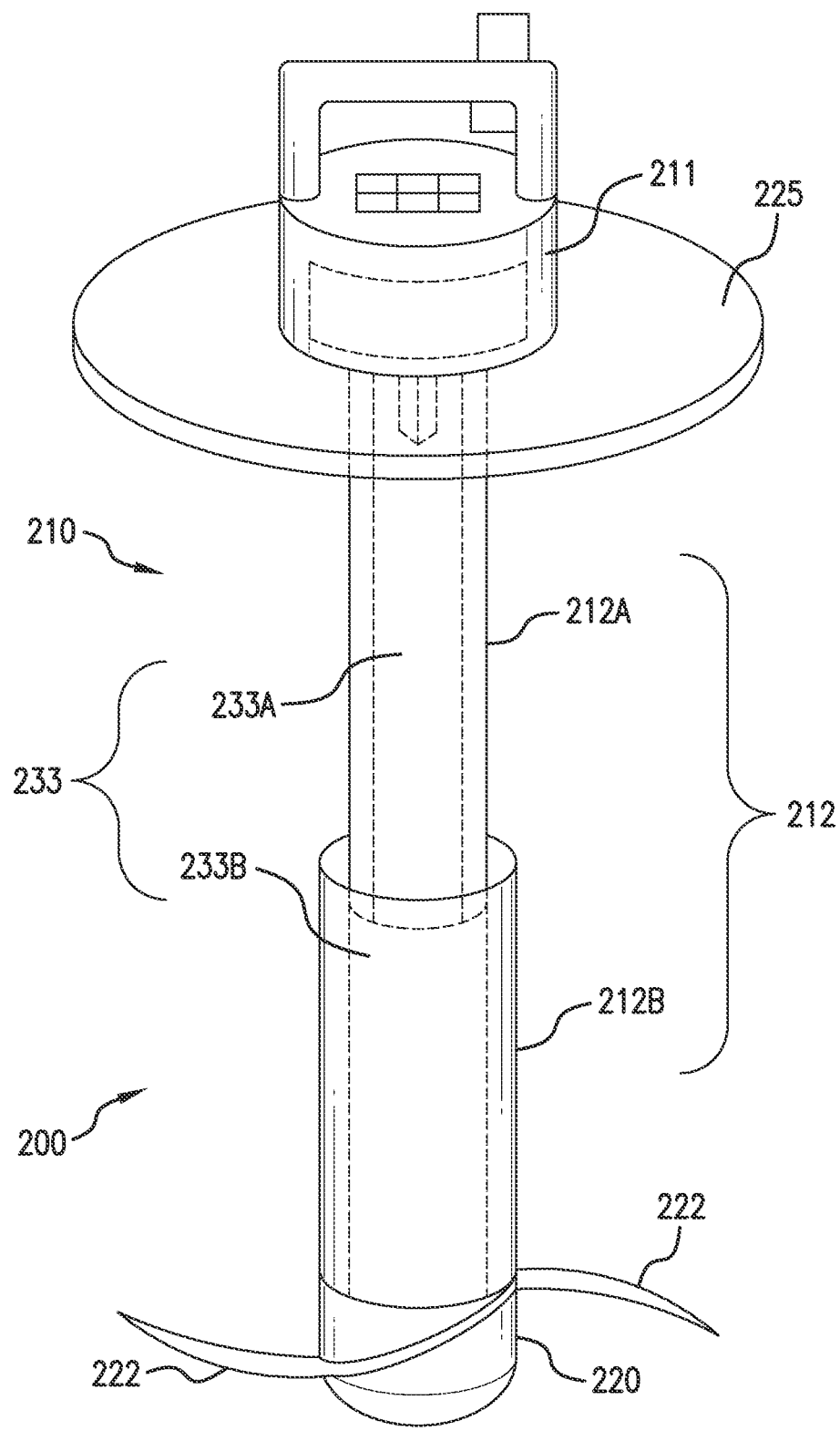
FIG. 13 illustrates another preferred embodiment of the apparatus of the present invention.

FIG. 13 illustrates another preferred embodiment of the apparatus of the present invention, which is designated generally by the reference numeral 200. With reference to FIG. 13, the apparatus 200 includes a housing 210 which includes a main housing 211 and a adjustable cylinder housing portion 212. The adjustable cylinder housing portion 212 also includes upper portion 212A and lower portion 212B. The upper portion 212A is moveable within the lower portion 212B. Within the adjustable cylinder housing portion 212 is situated an adjustable rotating rod assembly 233. The rotating rod assembly 233 includes the upper portion 233A and the lower portion 233B as shown. The upper portion 233A is moveable within the lower portion 233B. With reference once again to FIG. 13, the apparatus 200 also includes plate 225, as shown, and food processing attachment 220 having food processing blades 222 as shown. In the preferred embodiment of FIG. 13, the adjustable cylinder housing 212 and the adjustable rod assembly 233 are adjustable lengthwise.

Figure 14:
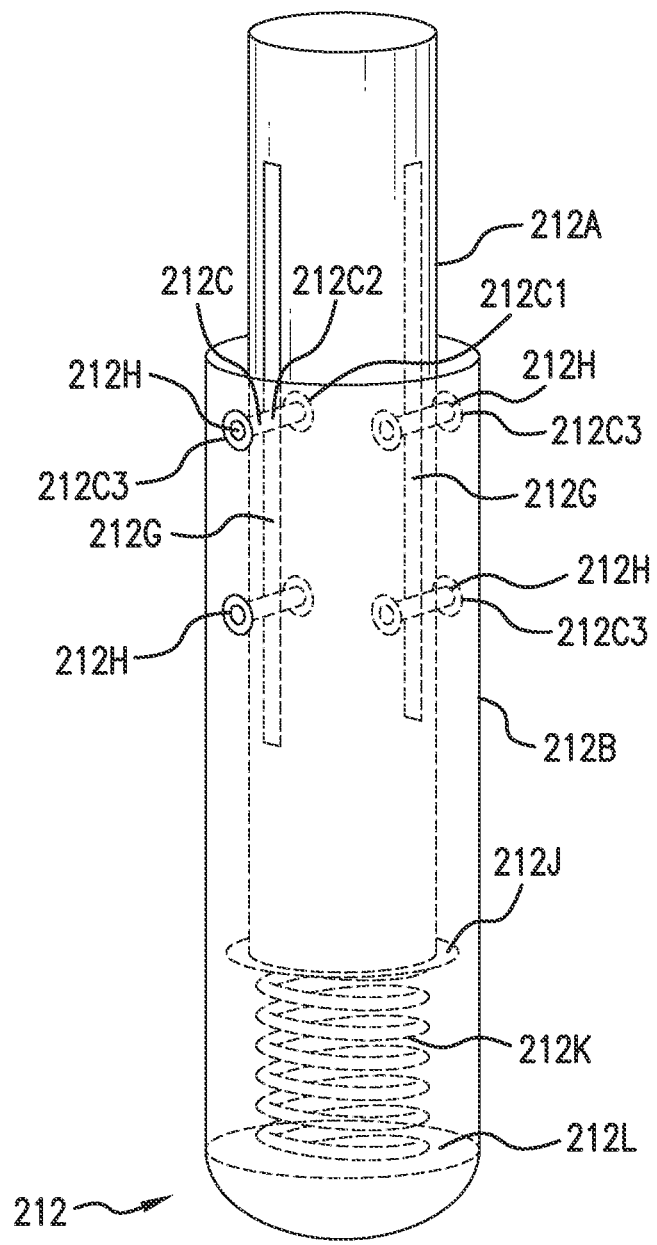
FIG. 14 illustrates a preferred embodiment of the adjustable cylinder housing portion of FIG. 13.

FIG. 14 illustrates a preferred embodiment of the adjustable cylinder housing portion 212 of FIG. 13. With reference to FIG. 14, the adjustable cylinder housing portion 212 includes a upper portion 212A which can be attached to the underside of the main housing 211 when the apparatus 200 is assembled, and a lower portion 212B which is positioned adjacent to the food processing attachment 220. In a preferred embodiment, the upper portion 212A can have a longitudinal slot(s) 212G running lengthwise down each side thereof which, in a preferred embodiment, can facilitate connecting the upper portion 212A to and with the lower portion 212B in a slideably connected manner. In a preferred embodiment, the upper portion 212A has two longitudinal slots 212G which are diametrically opposite each other. In another preferred embodiment, the upper portion 212A can have any number of longitudinal slots 212G located at any appropriate location in or on the upper portion 212A. In a preferred embodiment, the adjustable cylindrical housing portion 212 also includes a spring 212K which provides the tension and/or bias for facilitating the compression and expansion of the adjustable cylindrical housing portion.

In a preferred embodiment, the upper portion 212A has, on the bottom side thereof a cylindrical plate 212J which is utilized in connection with the spring 212K in order to provide a connecting surface for the spring 212K as shown. In a preferred embodiment, the spring 212K is situated and placed between the bottom side of the cylindrical plate 212J and the top side cylindrical plate 212L located at the bottom of the interior of the lower portion 212B. In a preferred embodiment, the spring 212K provides the appropriate tension and/or bias between the upper portion 212A and the lower portion 212B for facilitating the compression of the adjustable cylindrical housing portion 212. In a preferred embodiment, the spring 212K is selected to be sized so that it will being situated around the rotating rod assembly 233 and so as not to interfere with the rotating rod assembly 233 which, when the apparatus 200 is fully assembled, will be positioned and which will rotate within the space in the center of the spring 212K.

In a preferred embodiment, the lower portion 212B can have at least two holes or openings 212H on each side thereof which can correspond to each longitudinal slot(s) 212G located in or on the upper portion 212A and which can facilitate or allow placement of a connector element(s) 212C for attaching the lower portion 212B to the upper portion 212A as shown in FIG. 14. In a preferred embodiment, the connecting element(s) 212C can be any suitable device or assembly of devices, a rivet or a rivet-like device, element, or item, or an appropriately-sized nut and bolt assembly, or any hardware or assembly of hardware. In a preferred embodiment, two connecting elements 212C can be utilized in conjunction with each longitudinal slot 212G in the upper portion 212A.

In a preferred embodiment, the inner end portion 212C1 of each connecting element 212C is sized to be larger than the longitudinal slot 212G so that the middle portion 212C2 of each connecting element 212C can be passed through the longitudinal slot 212G of the upper portion 212A during assembly of the cylindrical housing portion 212 while each inner end portion 212C1 of same is retained by the interior wall of the upper portion 212A, as shown. In a preferred embodiment, each inner end portion 212C1 is sized to be larger than the width of the longitudinal slot 212G so that each inner end portion 212C1 of each connecting element 212C is retained inside the upper portion 212A. Each connecting element 212C extends through the longitudinal slot 212G of the upper portion 212A and through the holes or openings 212H of the lower portion 212B and extends beyond the exterior side wall of the lower portion. Each outer end portion 212C3, having a size larger that the diameter of the hole or opening 212H is connected to the end of each connecting element 212C which extends beyond the exterior wall of the lower portion 212B so that each outer end portion is located adjacent the exterior wall of the lower portion 212B when the adjustable cylindrical hosing portion 212 is assembled.

The assembly of the adjustable cylindrical housing portion 212 facilitates the longitudinal movement of the lower portion 212B along the longitudinal slots 212G so that its movement towards in the direction towards the main housing portion 211 results in a shortening of the length of the adjustable cylindrical housing portion 212 and its movement in the direction away from the main housing portion 211 results in a lengthening of the adjustable cylindrical housing portion 212.

Figure 15:
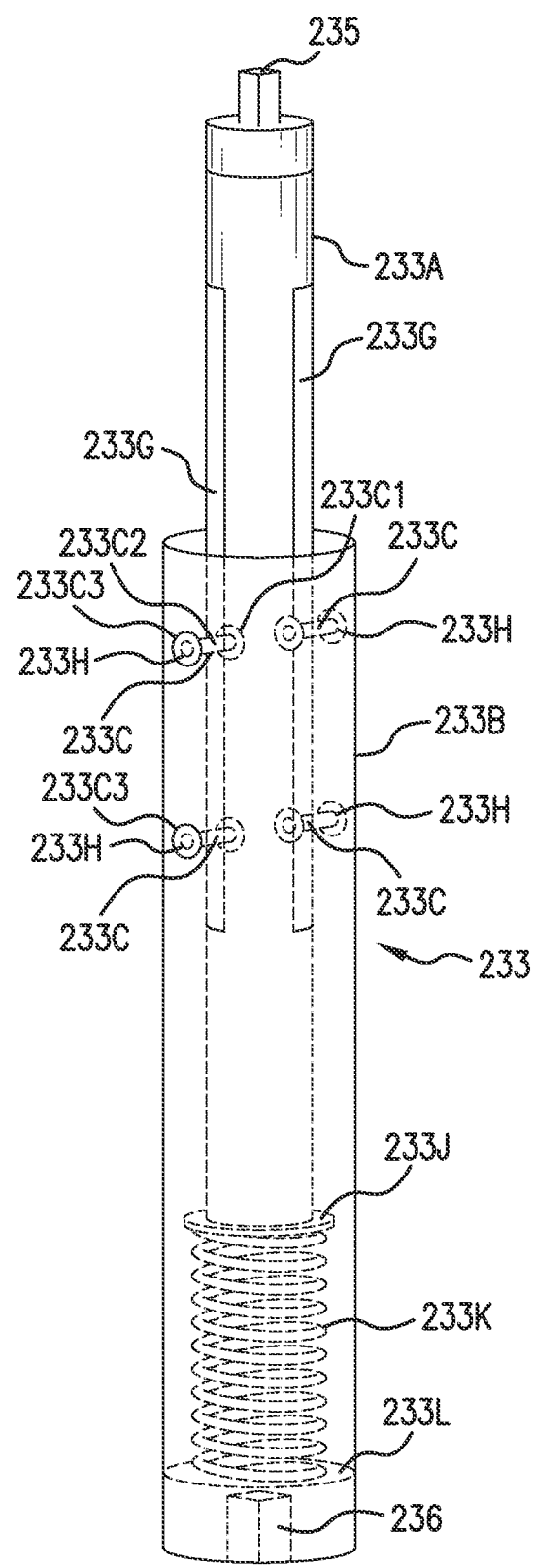
FIG. 15 illustrates a preferred embodiment of the adjustable rotating rod assembly of FIG. 13.

FIG. 15 illustrates a preferred embodiment of the adjustable rotating rod assembly 233 of FIG. 13. With reference to FIG. 15, the adjustable rotating rod assembly 233 includes a upper portion 233A and a lower portion 233B. In a preferred embodiment, the upper portion 233A can have a male connector section 235 which can be secured in place in a female connector section 34 of the drive mechanism 32 and the upper portion 233A can be secured with the drive mechanism 32 by using any suitable or appropriate securing elements, devices, or means, which are known by those persons skilled in the art for securing such connections. In a preferred embodiment, the respective connector sections 34 and 235 can be of such a respective and corresponding shape(s) so as to ensure that the rotational energy of the drive mechanism 32 is transferred to the upper portion 233A in a complete a manner as possible. In this regard, in a preferred embodiment, for example, the female connector section 34 can have an opening which is square in shape while the male connector section 235 can also be square in shape in order to mate with the female connector 34.

With reference once again to FIG. 15, the lower portion 233B of the adjustable rotating rod assembly 233 and the food processing attachment 20, in a preferred embodiment, are connected and secured together using suitable respective male and female connecting elements. For example, in a preferred embodiment, the lower portion 233B of the adjustable rotating rod assembly 233 can include, at the bottom portion of same and at the center thereof, a female connector section 236 which can receive a male connector section 23 located at the top end portion of the food processing attachment 20 and centrally positioned thereon. In a preferred embodiment, the male connector section 23 of the food processing attachment 20 can be received into and can be secured in place in and with the female connector section 236 of the lower portion 233B of the adjustable rotating rod assembly 233 and the food processor attachment 20 can be secured with the lower portion 233B of the adjustable rotating rod assembly 233 by using any suitable or appropriate securing elements, devices, or means, which are known by those persons skilled in the art for securing such connections.

In a preferred embodiment, the respective connector sections 236 and 23 can be of such a respective and corresponding shape(s) so as to ensure that the rotational energy of the adjustable rotating rod assembly 233 is transferred to the food processing attachment 20 in a complete a manner as possible. In this regard, in a preferred embodiment, for example, the female connector section 236 can have an opening which is square in shape while the male connector section 23 can also be square in shape in order to mate with the female connector 236. Although square shapes are described herein as being utilized in the design and/or selection of the various connector sections 34, 235, 236, and 23, it is important to note that, in the preferred embodiment, any shapes can be utilized in the design and selection of these respective connectors. For example, the various connector sections can be three-sided, four sided and rectangular, five-sided, six-sided, or have any number of sides, or can be rectangular, triangular, or can be, or can have, any appropriate or desired shape.

With reference once again to FIG. 15, the upper portion 233A can have a longitudinal slot(s) 233G running lengthwise down each side thereof which, in a preferred embodiment, which can facilitate connecting the upper portion 233A to and with the lower portion 233B in a slideably connected manner. In a preferred embodiment, the upper portion 233A has two longitudinal slots 233G which are diametrically opposite each other. In another preferred embodiment, the upper portion 233A can have any number of longitudinal slots 233G located at any appropriate location in or on the upper portion 233A. In a preferred embodiment, the adjustable rotating rod assembly 233 also includes a spring 233K which provides the tension and/or bias for facilitating the compression and expansion of the adjustable rotating rod assembly 233. In a preferred embodiment, the upper portion 233A has, on the bottom side thereof a cylindrical plate 233J which is utilized in connection with the spring 233K in order to provide a connecting surface for the spring 233K as shown. In a preferred embodiment, the spring 233K is situated and placed between the bottom side of the upper portion 233J and the top side cylindrical plate 233L located in the lower region of the lower portion 233B as shown. In a preferred embodiment, the spring 233K provides the appropriate tension and/or bias between the upper portion 233A and the lower portion 233B for facilitating the compression of the adjustable rotating rod assembly 233.

In a preferred embodiment, the lower portion 233B can have at least two holes or openings 233H on each side thereof which can correspond to each longitudinal slot(s) 233G located in or on the upper portion 233A and which can facilitate or allow placement of a connector element(s) 233C for attaching the lower portion 233B to the upper portion 233A as shown in FIG. 15. In a preferred embodiment, the connecting element(s) 233C can be any suitable device or assembly of devices, a rivet or a rivet-like device, element, or item, or an appropriately-sized nut and bolt assembly, or any hardware or assembly of hardware. In a preferred embodiment, two connecting elements 233C can be utilized in conjunction with each longitudinal slot 233G in the upper portion 233A.

In a preferred embodiment, the inner end portion 233C1 of each connecting element 233C is sized to be larger than the longitudinal slot 233G so that the middle portion 233C2 of each connecting element 233C can be passed through the longitudinal slot 233G of the upper portion 233A during assembly of the cylindrical housing portion 233 while each inner end portion 233C1 of same is retained by the interior wall of the upper portion 233A, as shown. In a preferred embodiment, each inner end portion 233C1 is sized to be larger than the width of the longitudinal slot 233G so that each inner end portion 233C1 of each connecting element 233C is retained inside the upper portion 233A. Each connecting element 233C extends through the longitudinal slot 233G of the upper portion 233A and through the holes or openings 233H of the lower portion 233B and extends beyond the exterior side wall of the lower portion. Each outer end portion 233C3, having a size larger that the diameter of the hole or opening 233H is connected to the end of each connecting element 233C which extends beyond the exterior wall of the lower portion 233B so that each outer end portion is located adjacent the exterior wall of the lower portion 233B when the adjustable rotating rod assembly 233 is assembled.

The assembly of the adjustable rotating rod assembly 233 facilitates the longitudinal movement of the lower portion 233B along the longitudinal slots 233G so that its movement towards in the direction towards the main housing portion 211 results in a shortening of the length of the adjustable rotating rod assembly 233 and its movement in the direction away from the main housing portion 211 results in a lengthening of the adjustable rotating rod assembly 233. Further, the assembly of the adjustable rotating rod assembly 233 also provides that the rotation of the lower portion 233B is driven by the rotation of the upper portion 233A. In this regard, the adjustable rotating rod assembly 233 of FIG. 15 can be used to drive the food operation of the food processor attachment 20 while allowing the adjustable rotating rod to be compressible and/or adjustable lengthwise.

Figure 16:
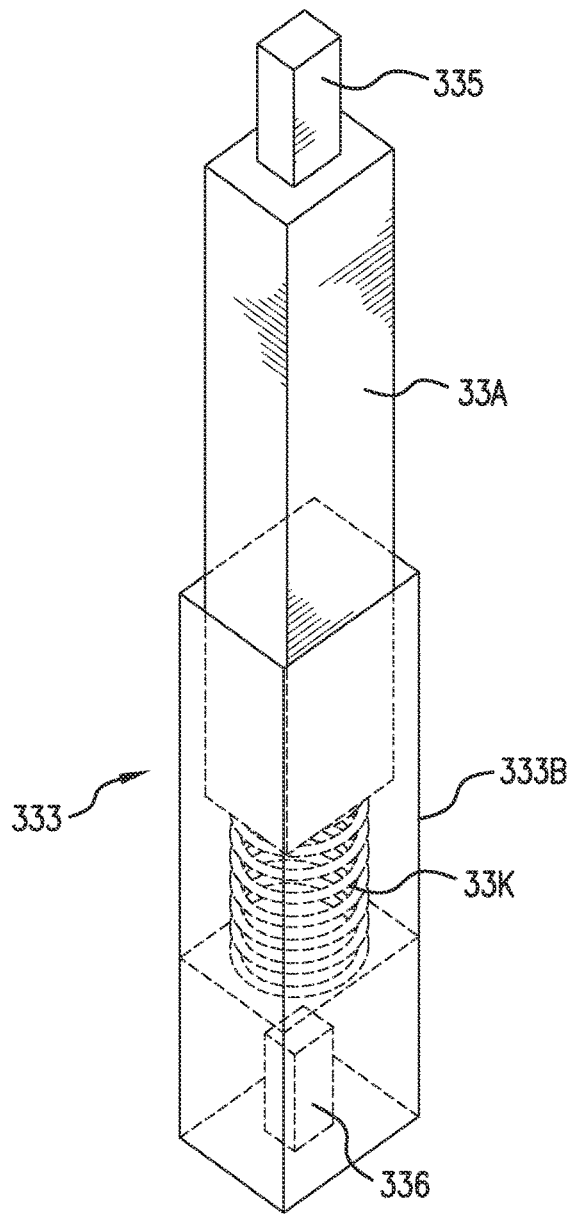
FIG. 16 illustrates another preferred embodiment of the adjustable rotating rod assembly of FIG. 13.

FIG. 16 illustrates another preferred embodiment of the adjustable rotating rod assembly of FIG. 13 which is designated by the reference numeral 333. The adjustable rotating rod assembly 333 dispenses with the need for the longitudinal slots 233G, the holes or openings 233H, and the connecting elements 233C of the adjustable rotating rod assembly 233 of FIG. 15 and operates on a principal that a non-circular object, when placed within at least a portion of an inner periphery of a slightly larger similarly shaped non-circular object, will, when rotated within the portion of the slightly larger similarly shaped non-circular object, will cause the rotation of the slightly larger similarly shaped non-circular object.

With reference to FIG. 16, the adjustable rotating rod assembly 333 includes a upper portion 333A and a lower portion 333B. In a preferred embodiment, the upper portion 333A can have a male connector section 335 which can be secured in place in a female connector section 34 of the drive mechanism 32 and the upper portion 333A can be secured with the drive mechanism 32 by using any suitable or appropriate securing elements, devices, or means, which are known by those persons skilled in the art for securing such connections. In a preferred embodiment, the respective connector sections 34 and 335 can be of such a respective and corresponding shape(s) so as to ensure that the rotational energy of the drive mechanism 32 is transferred to the upper portion 333A in a complete a manner as possible. In this regard, in a preferred embodiment, for example, the female connector section 34 can have an opening which is square in shape while the male connector section 335 can also be square in shape in order to mate with the female connector 34.

With reference once again to FIG. 16, the lower portion 333B of the adjustable rotating rod assembly 333 and the food processing attachment 20, in a preferred embodiment, are connected and secured together using suitable respective male and female connecting elements. For example, in a preferred embodiment, the lower portion 333B of the adjustable rotating rod assembly 333 can include, at the bottom portion of same and at the center thereof, a female connector section 336 which can receive a male connector section 23 located at the top end portion of the food processing attachment 20 and centrally positioned thereon. In a preferred embodiment, the male connector section 23 of the food processing attachment 20 can be received into and can be secured in place in and with the female connector section 336 of the lower portion 333B of the adjustable rotating rod assembly 333 and the food processor attachment 20 can be secured with the lower portion 333B of the adjustable rotating rod assembly 333 by using any suitable or appropriate securing elements, devices, or means, which are known by those persons skilled in the art for securing such connections.

In a preferred embodiment, the respective connector sections 336 and 23 can be of such a respective and corresponding shape(s) so as to ensure that the rotational energy of the adjustable rotating rod assembly 333 is transferred to the food processing attachment 20 in a complete manner as possible. In this regard, in a preferred embodiment, for example, the female connector section 336 can have an opening which is square in shape while the male connector section 23 can also be square in shape in order to mate with the female connector 336. Although square shapes are described herein as being utilized in the design and/or selection of the various connector sections 34, 335, 336, and 23, it is important to note that, in the preferred embodiment, any shapes can be utilized in the design and selection of these respective connectors. For example, the various connector sections can be three-sided, four sided and rectangular, five-sided, six-sided, or have any number of sides, or can be rectangular, triangular, or can be, or can have, any appropriate or desired shape.

In a preferred embodiment, the adjustable rotating rod assembly 333 also includes a spring 333K which provides the tension and/or bias for facilitating the compression and expansion of the adjustable rotating rod assembly 333. In a preferred embodiment, the upper portion 333A has, on the bottom side thereof a cylindrical plate 333J which is utilized in connection with the spring 333K in order to provide a connecting surface for the spring 333K as shown. In a preferred embodiment, the spring 333K is situated and placed between the bottom side of the upper portion 333J and the top side cylindrical plate 333L located in the lower region of the lower portion 333B as shown. In a preferred embodiment, the spring 333K provides the appropriate tension and/or bias between the upper portion 333A and the lower portion 333B for facilitating the compression of the adjustable rotating rod assembly 333.

Figure 17A:
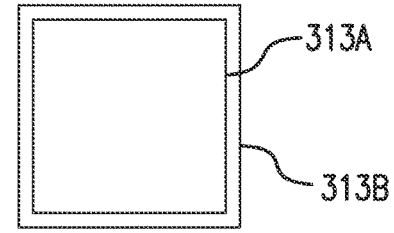
FIGS. 17A, 17B, and 17C illustrate various cross sectional views of the adjustable rotation rod assembly of FIG. 16 and illustrating the principle of the operation of same.
Figure 17B:
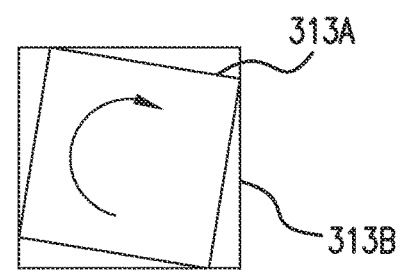
Figure 17C:
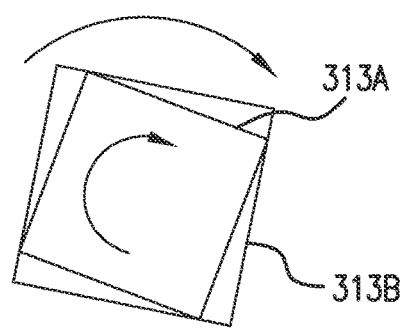

FIGS. 17A, 17B, and 17C illustrate various cross sectional views of the adjustable rotation rod assembly 333 of FIG. 16 illustrating a portion of same wherein the upper portion 333B is situated inside the lower portion 333B and illustrating the principle of the operation of the adjustable rotating rod assembly 333 of FIG. 16. In the preferred embodiment of FIGS. 16, 17A, 17B, and 17C, each of upper portion 333A and the lower portion 333B are selected as having a square cross section as shown, with the size of the lower portion 333A being slightly smaller than the size of the lower portion 333B as shown in FIG. 17A. Although selected as having a square cross sectional shape in the preferred embodiment of FIGS. 16 and 17, it is important to not that the upper portion 333A and the lower portion 333B can be selected or chosen to have any non-circular shape and can be sized in relation to one another so that the upper portion 333A can fit inside the inner periphery of the lower portion 333B as shown in FIG. 17A and so that the adjustable rotation rod assembly 333 can operate as described and illustrated with reference to FIGS. 17A, 17B, and 17C.

With reference FIG. 17A, the portion of the upper portion 333A is situated as shown to be within the portion of the lower portion 333B. With reference to FIG. 17B, as the upper portions 333A rotates when driven by the drive mechanism 32, the upper portion 333A rotates until it comes into contact the inner wall of the lower portion 333B as shown. In a preferred embodiment, since the size of the upper portion 333A is selected to be slightly smaller than the size of the lower portion 333B, contact between the two will be ensured. Once contact between the upper portion 333A and the lower portion 333B is established, then the continued rotation of the upper portion 333A will drive the rotation of the lower portion 333B as shown in FIG. 17C. Once the rotation of the upper portion 333A drives the rotation of the lower portion 333B, the rotation of the adjustable rotating rod assembly commences and the adjustable rotation rod assembly 333 will drive the food processor attachment 20 and the food processing blades 22 of same.

The adjustable rotating rod assembly of FIG. 16 and FIGS. 17A, 17B, and 17C can be used to drive the food operation of the food processor attachment 20 while allowing the adjustable rotating rod assembly 333 to be compressible and/or adjustable lengthwise.

In another preferred embodiment, the plate 25 can be secured to the respective cooking pot, cooking container, cooking utensil, or any other device or item, using any suitable connecting devices, elements, springs loaded devices, clips, or any other connectors. For example, a circular fitting which can have flanges which can correspond to flanges of the plate, or which can have horizontally extending edges, can be secured to the top edge of the respective cooking pot, cooking container, cooking utensil, or any other device or item. Once the apparatus is placed on the top of the respective cooking pot, cooking container, cooking utensil, or any other device or item, the edge of the plate, or a flange (if utilized), can then be secured to the horizontally extending edge, or a flange (if utilized), on or of the circular fitting by using any suitable connecting element, including, but not limited to, a C-clamped connector, a spring-loaded clip or connector, or any other suitable device.

Figure 18:
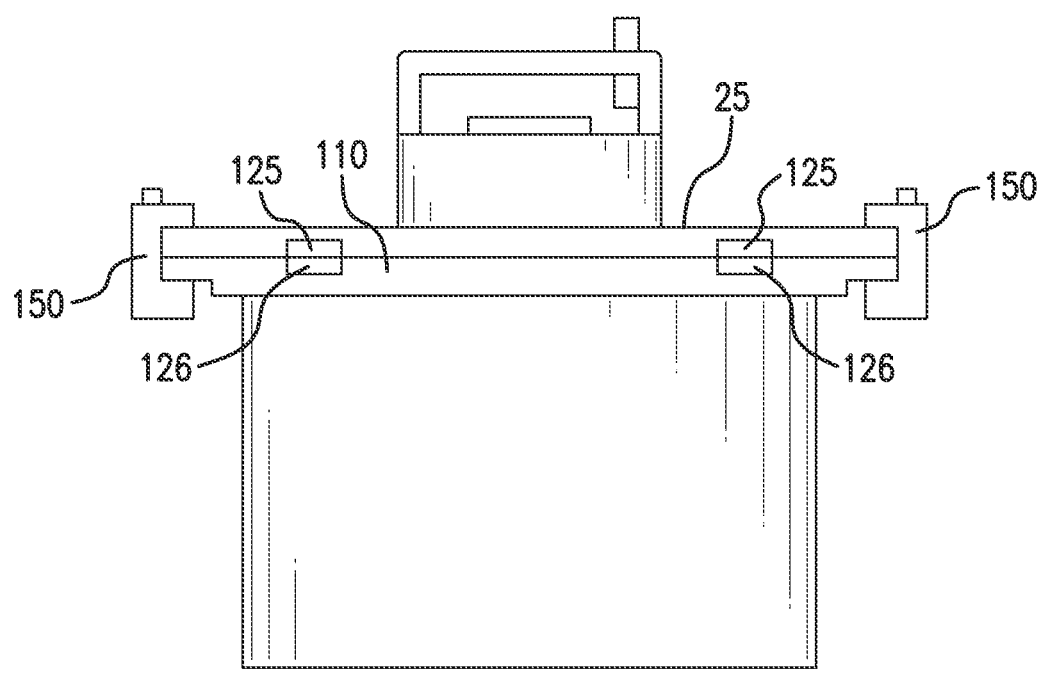
FIG. 18 illustrates another preferred embodiment of the apparatus of the present invention wherein the apparatus can be secured to a cooking pot, cooking container, cooking utensil, or any other device or item.

FIG. 18 illustrates another preferred embodiment of the apparatus 100 of the present invention wherein the apparatus 100 can be secured to a cooking pot, cooking container, cooking utensil, or any other device or item. With reference to FIG. 18, in a preferred embodiment, the plate 25 can be sized so as to extend beyond the sides of the cooking pot, cooking container, cooking utensil, or any other device or item as shown, and the plate can also have extending therefrom any number of flanges 125 around the periphery of the plate 25 as shown. In a preferred embodiment, circular fitting 210, having an outer diameter which corresponds to, or is approximately, the size of the diameter of the plate 25 can be affixed to and/or secured to the top of the cooking pot, cooking container, cooking utensil, or any other device or item, as shown. In a preferred embodiment, the circular fitting 110 also has flanges 126 which are positioned to be in alignment with the flanges 125 of the plates 25 as shown. Once plate 25 is set atop and centered about the circular fitting 100, one or more C-clamp connectors 150 can be utilized to clamp the plate 25 to the outer edge of the circular fitting 110 as shown. Although illustrated in FIG. 18 as be clamped at the edges as shown, the plate 25 and the circular fitting 110 can also be clamped together by attaching the C-clamp connectors 150 so as to clamp together one or more of the flanges 125 of the plate 25 to the corresponding flanges 126 of the circular fitting 110. In another preferred embodiment, C-clamp connectors 150 can also be utilized to clamp together the plate 25 to the outer edge of the circular fitting 110 as well to clamp together one or more flanges 125 of the plates to one or more flanges 126 of the circular fitting 110.

In another preferred embodiment, the apparatus 100 of the present invention can also be designed so that the main housing 11 can be secured at any desired height above the plate 25 during use. To facilitate securing the main housing 11 at any desired height above the plate 25, the cylindrical housing portion 12 can be designed to have a longitudinal strip of material, or any number of longitudinal strips of material, which can be made of rubber or any other suitable material, and which can run lengthwise along and down the cylindrical housing portion 12. A height adjuster element, which can be placed between the main housing 11 and the plate 25 during the assembly of the apparatus 100 for that particular use, can be equipped with a bolt and an associated turning or rotating portion which can be turned in order to turn the bolt so as to cause the bolt to be moved into a contact with the longitudinal strip of material, so as to hold the cylindrical housing portion 12 and the main housing 11 in a non-moveable and/or stationary contact with each other and at a desired elevation above the plate 25 and, correspondingly, to maintain the food processing attachment 20 at a desired position within the respective cooking pot, cooking container, cooking utensil, or any other device or item. In this manner, if a particular height adjustment is desired for the main housing 11 to be secured above the plate 25, or if a particular position of the food processing attachment 20 within the respective cooking pot, cooking container, cooking utensil, is desired, the apparatus 100 of the present invention can be utilized to effectuate same.

Figure 19A:
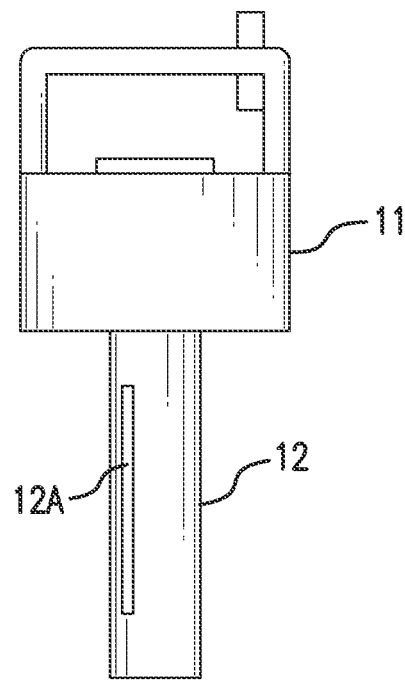
FIGS. 19A and 19B illustrate another preferred embodiment of the apparatus of the present invention wherein the main housing can be secured at a desired height or location above the plate.
Figure 19B:
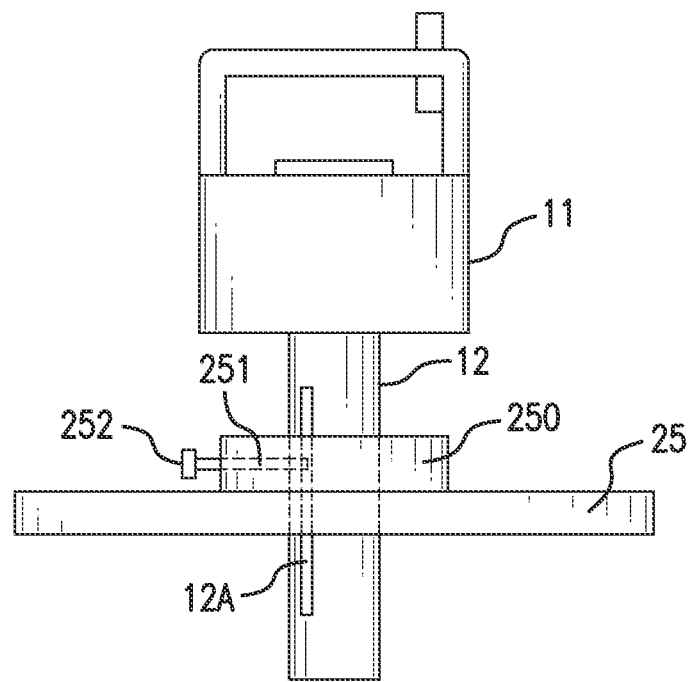

FIGS. 19A and 19B illustrate another preferred embodiment of the apparatus 100 of the present invention wherein the main housing 11 can be secured at a desired height or location above the plate 25. FIG. 19A illustrates the main housing 11 and the cylindrical housing portion 12 of the apparatus 100. With reference to FIG. 19A, the cylindrical housing portion 12 can be designed to have a longitudinal strip of material 12A, or any number of longitudinal strips of material 12A, which can be made of rubber or any other suitable material, and which can run lengthwise along and down the cylindrical housing portion 12, as shown. FIG. 19B illustrates the main housing 11 and the cylindrical housing portion 12 of the apparatus 100 of FIG. 19A along with the plate 25 and height adjuster element 250. With reference to FIG. 19B. the height adjuster element 250, which can be placed between the main housing 11 and the plate 25, as shown, during the assembly of the apparatus 100 for that particular use, can be equipped with a bolt 251 and an associated turning or rotating portion or knob 252 which can be turned in order to turn the bolt 251 so as to cause the bolt to be moved into contact with the longitudinal strip of material 12A, so as to hold, or lock in place, the cylindrical housing portion 12 and the main housing 11 in a non-moveable and/or stationary contact with each other and at a desired elevation above the plate 25 and, correspondingly, to maintain the food processing attachment 20 at a desired position within the respective cooking pot, cooking container, cooking utensil, or any other device or item. In this manner, if a particular height adjustment is desired for the main housing 11 to be secured above the plate 25, or if a particular position of the food processing attachment 20 within the respective cooking pot, cooking container, cooking utensil, is desired, the height adjuster element 250, or any equivalent device, can be utilized in conjunction with the apparatus 100 of the present invention to effectuate same so as to secure, and/or so as to lock in place, the main housing 11 any desired distance above, from, and/or relative to, the plate 25. It is important to note that any suitable device or devices can be utilized as a substitute for the height adjuster element 250.

The apparatus 100 and method of the present invention can be utilized to perform any type or kind of food processing operations, activities, and/or functions, with or involving any types or kinds of foods and/or food ingredients. The apparatus 100 and method of the present invention can also be utilized to perform any type or kind of food processing operations, activities, and/or functions, with or involving any types or kinds of hot or cold foods and/or food ingredients.

In another preferred embodiment, the apparatus 100 and method of the present invention can be utilized to perform any type or kind of food processing operations, activities, and/or functions, including, but not limited to foods or food ingredients which have been prepared by the simultaneous boiling and steam of same, the boiling of same, or the steaming of same, prior to processing same using the apparatus 100 of the present invention.

In any and/or all of the embodiments described herein, the use of an adjustable cylindrical housing portion 212 and any adjustable rotating rod assemblies 233 or 333 in connection with the apparatus 100 or 200 can allow a user or operator to use the apparatus 100 or 200 in connection with different sizes of cooking pots, cooking containers, cooking utensils, or any other devices or items.

In another preferred embodiment as well as any and/or all of the embodiments described herein, any type, kind, shape, or size, of plates 25 can be utilized in connection with the apparatus 100 or 200 so as to allow a user or operator to use the apparatus 100 or 200 in connection with different sizes of cooking pots, cooking containers, cooking utensils, or any other devices or items.

In another preferred embodiment as well as any and/or all of the embodiments described herein, any number, type, kind, shape, or size, of plates 25, cylindrical housing portions 12, adjustable cylindrical housing portions 212, rotating rods 13, adjustable rotating rod assemblies 233, or adjustable rotating rod assemblies 233, or food processing attachments 20, can be utilized with the apparatus 100 and/or 200 in an interchangeable manner or fashion for any type or kind, or application, of use.

The apparatus 100 and 200 of the present invention can be utilized in order to perform any food processing operations, food blending operations, food whisking operations or food whipping operations, or food beating operations, or any other operations on or with any types or kinds of foods, food ingredients, or liquids.

In any and/or all of the embodiments described herein, the apparatus 100 can also be designed, and can be utilized, to perform any number of food processing and/or food processing-related operations and/or modes of operations, which can include, but which are not limited to, chopping, mixing, blending, liquefying, grating, beating, whipping. whisking, stirring, pureeing, pulsing, ice crushing, crumbing, extracting, preparing dough, preparing smoothies, performing high speed operations, and/or performing food processing and/or any other food processing-related, operations on, with, or regarding any of the various types or kinds or food(s), food ingredient(s), or liquids(s), with which the apparatus 100 can be utilized.

In another preferred embodiments, as well as any and/or all of the embodiments described herein, the apparatus 100 can be programmed to perform any of the food processing and/or food processing-related operations or functions described herein. For example, a user need only select the desired food processing and/or food processing-related operation or function and then start the apparatus 100. In another preferred embodiment, the apparatus 100 can also be programmed to sequence through a number of different operations or functions. As and for an example, the apparatus 100 can, upon being selected to do so, perform a chopping operation, a mixing operation, a blending operation, and a liquefying operation on any food, food ingredient (s), or liquid(s). It is important to note that the apparatus 100 can also be programmed, or pre-programmed, to perform any of the herein-described operations or functions in any desired sequence for any desired period of time.

As and for an illustrative, but not limiting, example, when preparing a soup base, the apparatus 100 can be selected to chop the ingredients being processed for 30 seconds, then mix same for 30 seconds, then blend same for 30 seconds, and then liquefy same for 30 seconds before ceasing operation. As and for another illustrative, but not limiting, example, when preparing a smoothie, the apparatus 100 can be selected to crush ice for 30 seconds, chop the ingredients being processed for 30 seconds, then mix same for 30 seconds, then blend same for 30 seconds, and then liquefy same for 30 seconds before ceasing operation.

In a preferred embodiment, the apparatus 100 can also be designed, or can be preprogrammed, with any number of food processing operational or functional combinational sequences as well as the timed sequences for each operation or function utilized. In another preferred embodiment, the apparatus 100 can also be programmed by a user to perform any operations or functions in any sequential order or manner and/or for any desired time period(s).

Figure 20:
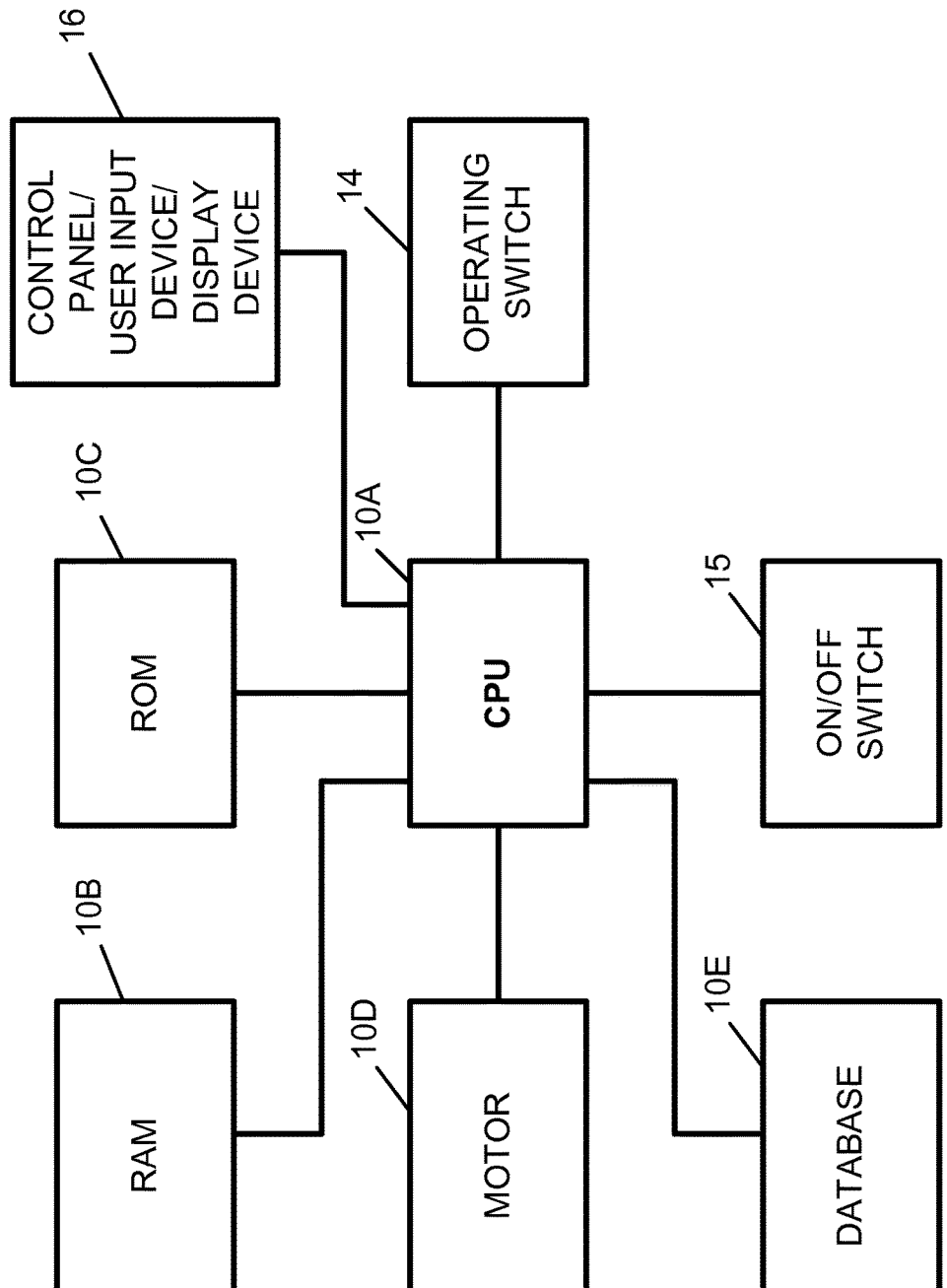
FIG. 20 illustrates a preferred embodiment of the apparatus of FIG. 1 illustrating the various components of same which are utilized in controlling the operation of, and/or the operating mode of, same, in block diagram form.

FIG. 20 illustrates a preferred embodiment of the apparatus 100 of FIG. 1 illustrating the various components of same which are utilized in controlling the operation of, and/or the operating mode of the apparatus 100, in block diagram form. With reference to FIG. 20, the apparatus 100 includes a central processing unit (CPU) 11A which can process any data, information, and/or instructions, for activating, de-activating, enabling, disabling, and/or controlling an operation of, the apparatus 100. The apparatus 100 also includes a random access memory (RAM) 11B for storing any data and/or information which can be utilized by the central CPU 11A. The apparatus 100 also include a read only memory (ROM) 11C for storing any data and/or information which can be utilized by the central CPU 11A. In a preferred embodiment, both the RAM 11B and the ROM 11C are connected to the CPU 11A.

With reference once again to FIG. 20, the CPU 11A is also connected to the motor 11D which is housed in the main housing portion 11. The CPU 11A controls the operation of the motor 11D. The apparatus 100 can also include a database 11E which can store any data, information, and/or instructions, which can be utilized by the CPU 11A. In a preferred embodiment, the CPU 11A, the RAM 11B, the ROM 11C, the motor 11D, and the database 11E are all housed within the main housing portion 11. With reference once again to FIG. 20, the operating switch 14 is connected to the CPU 11A, the On/Off Switch 15 is connected to the CPU 11A, and the control panel 16, which can also include a user input device and a display device, is also connected to the CPU 11A.

In a preferred embodiment, the user can select the mode of operation or the modes of operation of the apparatus 100 via the control panel 16, and can then activate the apparatus 100 via the operating switch 14 and/or the On/Off Switch 15 so as to operate the apparatus 100 as desired. The apparatus 100 and, in particular, the CPU 11A can be programmed in order to control the mode(s) of operation of the apparatus 100, the motor 11D, the food processing attachment 20, and/or the plurality of food processing blades 22, as well as to control the operating speed(s) of the apparatus 100, the motor 11D, the food processing attachment 20, and/or the food processing blades 22, so as to utilize the apparatus 100 in any of the herein-described, or any other suitable, modes of operation and/or in any sequential modes of operation.

In a preferred embodiment, the CPU 11A can be programmed with various modes of operation(s), and any times for operating same, including, for example, but not limited to, motor speed(s) and time(s) of operation, for or regarding each mode of operation, for performing each of a wide variety of chopping, mixing, blending, liquefying, grating, beating, whipping. whisking, stirring, pureeing, pulsing, ice crushing, crumbing, extracting, preparing dough, preparing smoothies, high speed operation(s), and/or food processing and/or any other food processing-related, modes of operations.

Figure 21:
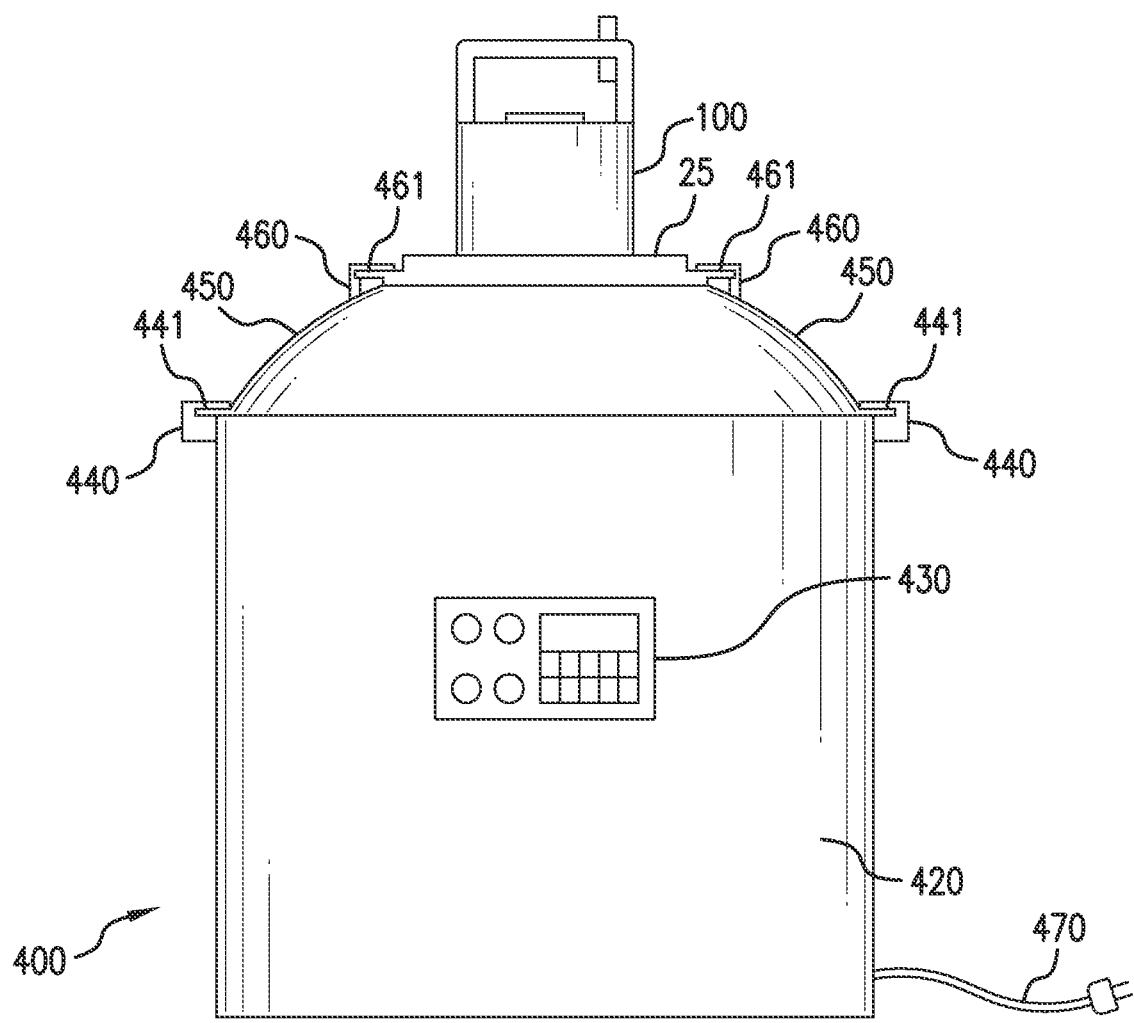
FIG. 21 illustrates a preferred embodiment of a cooking apparatus of the present invention with which the apparatus of FIG. 1 can be utilized.

In another preferred embodiment, the apparatus 100 of the present invention can be utilized with, or as a component of, a cooking apparatus. FIG. 21 illustrates a preferred embodiment of a cooking apparatus of the present invention with which the apparatus 100 of the present invention can be utilized. With reference to FIG. 21, the cooking apparatus of the present invention is designated generally by the reference numeral 400. With reference to FIG. 21, the cooking apparatus 400 includes a cooking pot 420 which, as described herein, can be equipped to operate as a conventional stovetop cooking pot and/or as a slow cooker, a lower lid assembly 450, which can be attached to the cooking pot 420 via any suitable flange connectors 440 as shown, which connectors or flanges can be of the same type or kind as any of the herein-described connectors or flanges 125, 126, or 150, or any other suitable connectors or flanges described herein, or can be any other suitable connecting or securing devices or means which are known to those skilled in the art of attaching and/or securing together two or more elements of a cooking apparatus.

With reference once again to FIG. 21, the apparatus 100 can be secured to the top portion of the lower lid assembly 450, as shown, via the plate 25 of the apparatus 100 and the flange connectors 460 located on the lower lid assembly 450. In a preferred embodiment, the lower lid assembly 450 is designed to have a sufficiently sized opening in the center of same so as to facilitate the placement of a portion of the apparatus 100 therein and therethrough so as to facilitate attachment of the apparatus 100 to the cooking pot 420 as shown in FIG. 21.

With reference once again to FIG. 21, the cooking apparatus 400 also includes, on the front side of the cooking pot, a control panel 430 which contains the necessary switches, control knobs, input keypad, and display device, needed for operating the cooking pot 420. The cooking apparatus 400 also includes a line cord 470 for connecting the cooking pot 420 to an AC (alternating current) power source. In another preferred embodiment, either or both of the cooking pot 420 and the apparatus 100 can also be battery powered.

Figure 22:
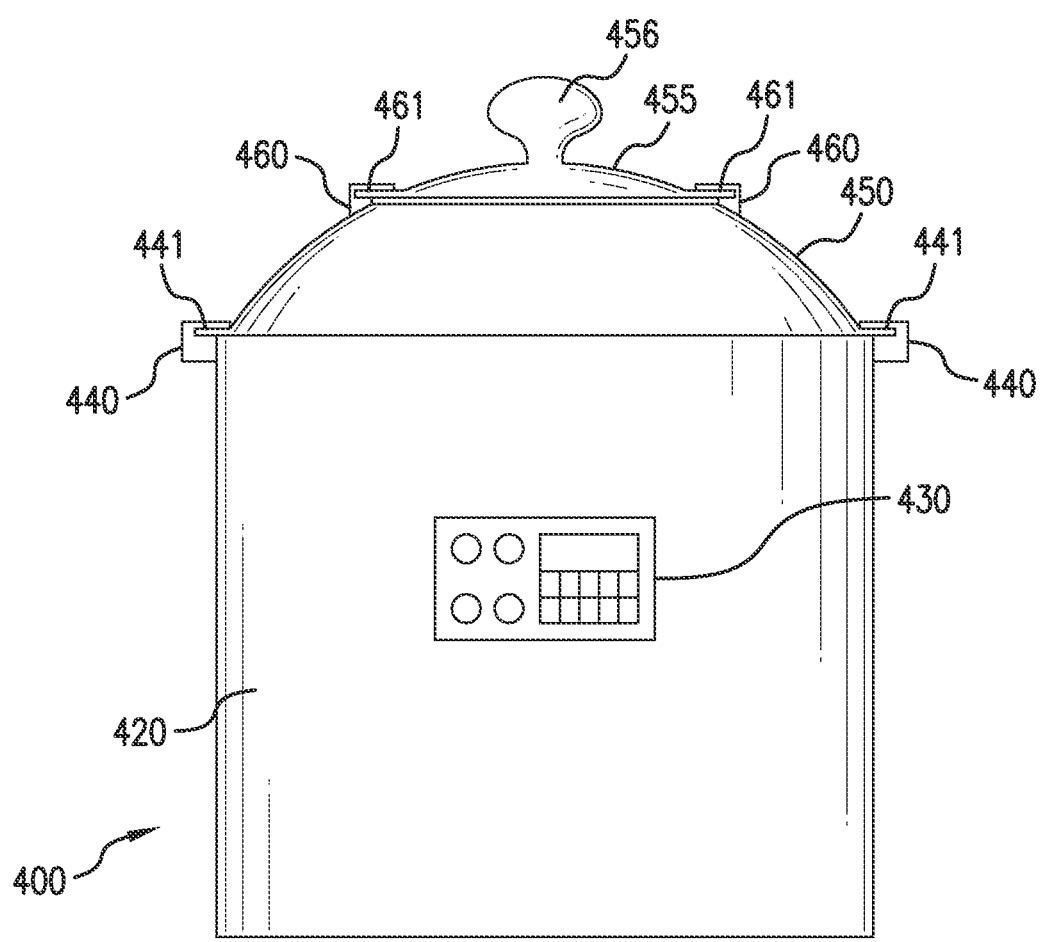
FIG. 22 illustrates the cooking apparatus of FIG. 22 with the apparatus of FIG. 1 removed and replaced by an upper lid assembly.

FIG. 22 illustrates the cooking apparatus 400 of FIG. 21 with the apparatus 100 removed and replaced by upper lid assembly 455, as shown, which is attached or secured to the lower lid assembly 450 by using the flange connectors 460 which are located on the lower lid assembly 450. In a preferred embodiment, the upper lid assembly 455 also includes a knob 456 for handling the upper lid assembly 455 and the upper lid assembly 455/lower lid assembly 450 combination when the two elements are secured together. Although shown and described as having a knob 456, it is important to note that the upper lid assembly 455 can also be equipped with, or have, any suitable handle or handles for handling the upper lid assembly 455 and the upper lid assembly 455/lower lid assembly 450 combination when the two elements are secured together.

Figure 23A:
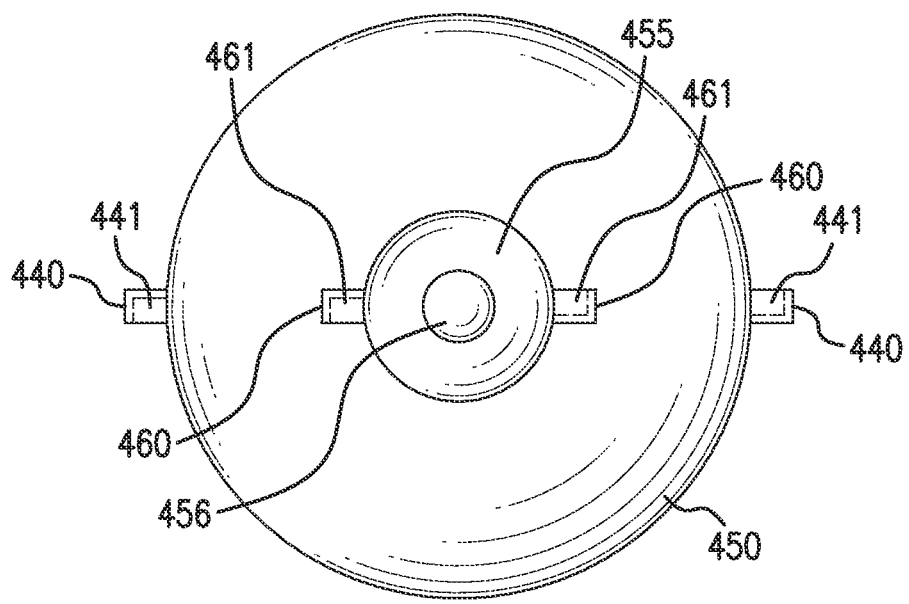
FIGS. 23A, 23B, and 23C illustrate the cooking apparatus of FIG. 22 from a top view perspective.
Figure 23B:
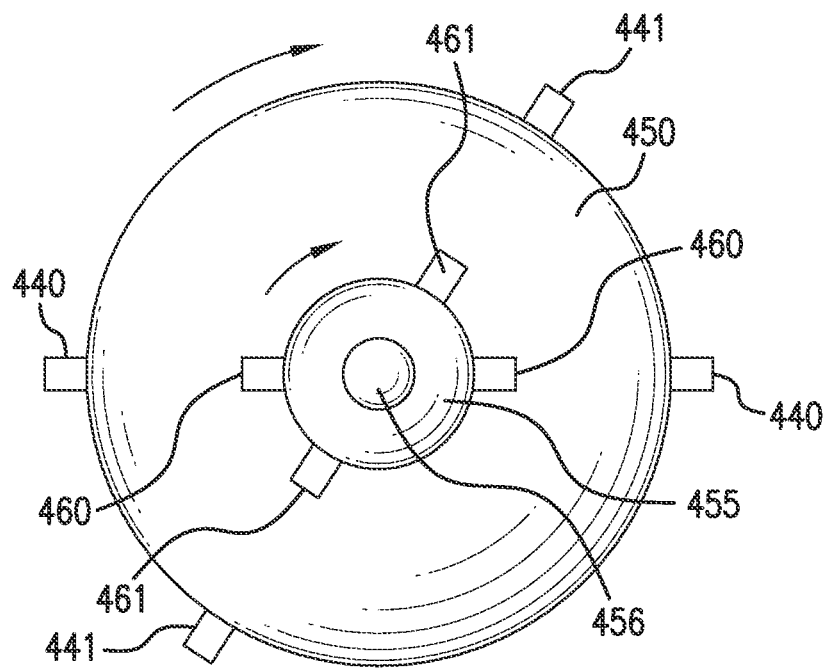
Figure 23C:
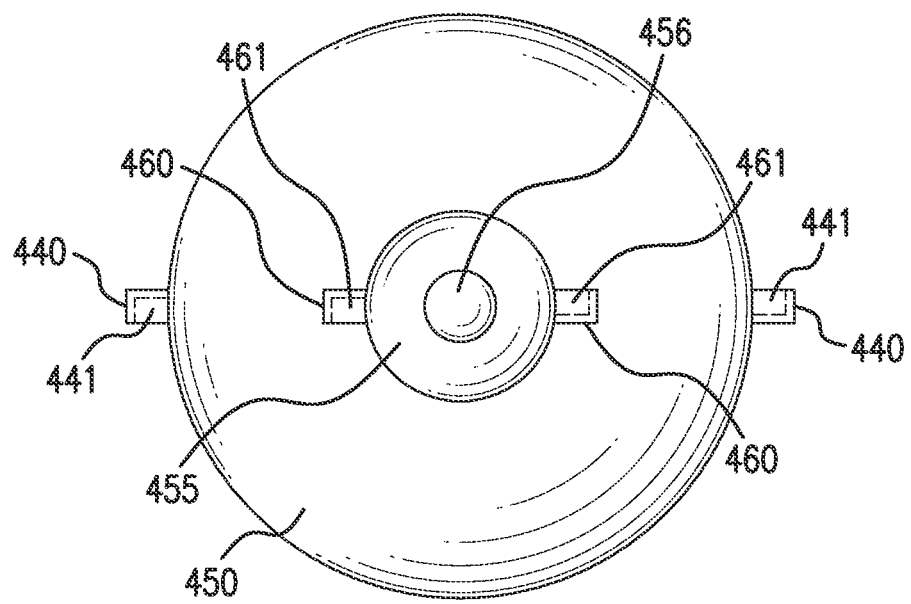

FIG. 23A illustrates the cooking apparatus 400 of FIG. 22 from a top view perspective and illustrating the upper lid assembly 455, having knob 456, being attached or secured to the lower lid assembly 450 via flange connectors 460. FIG. 23A also illustrates the flange connectors 440 for attaching or securing the lower lid portion to the cooking pot 420. FIGS. 23B and 23C illustrate how the lower lid assembly 450 is connected and attached to the cooking pot 420 by placing the lower lid assembly atop the cooking pot 420 and then by rotating the lower lid assembly 450 clockwise, as shown, until the flanges 441 of the lower lid assembly 450 mate with and within the flange connector 440 of the cooking pot 420, and illustrate how the upper lid assembly 455 is connected or attached to the lower lid assembly 450 by placing the upper lid assembly 455 atop the lower lid assembly 450 and by rotating the upper lid assembly 455 clockwise, as shown, in FIG. 23B until the flanges 461 of the upper lid assembly 455 mate with and within the flange connector 460 of the lower lid assembly 450. FIG. 23B illustrates the rotation of the lower lid assembly 450 relative to the cooking pot 420 and the rotation of the upper lid assembly 455 relative to the lower lid assembly 450. FIG. 23C illustrates the upper lid assembly 455 and its component parts mated with the lower lid assembly 450 and illustrates the lower lid assembly 450 and its component parts mated with the cooking pot 420.

Figure 24:
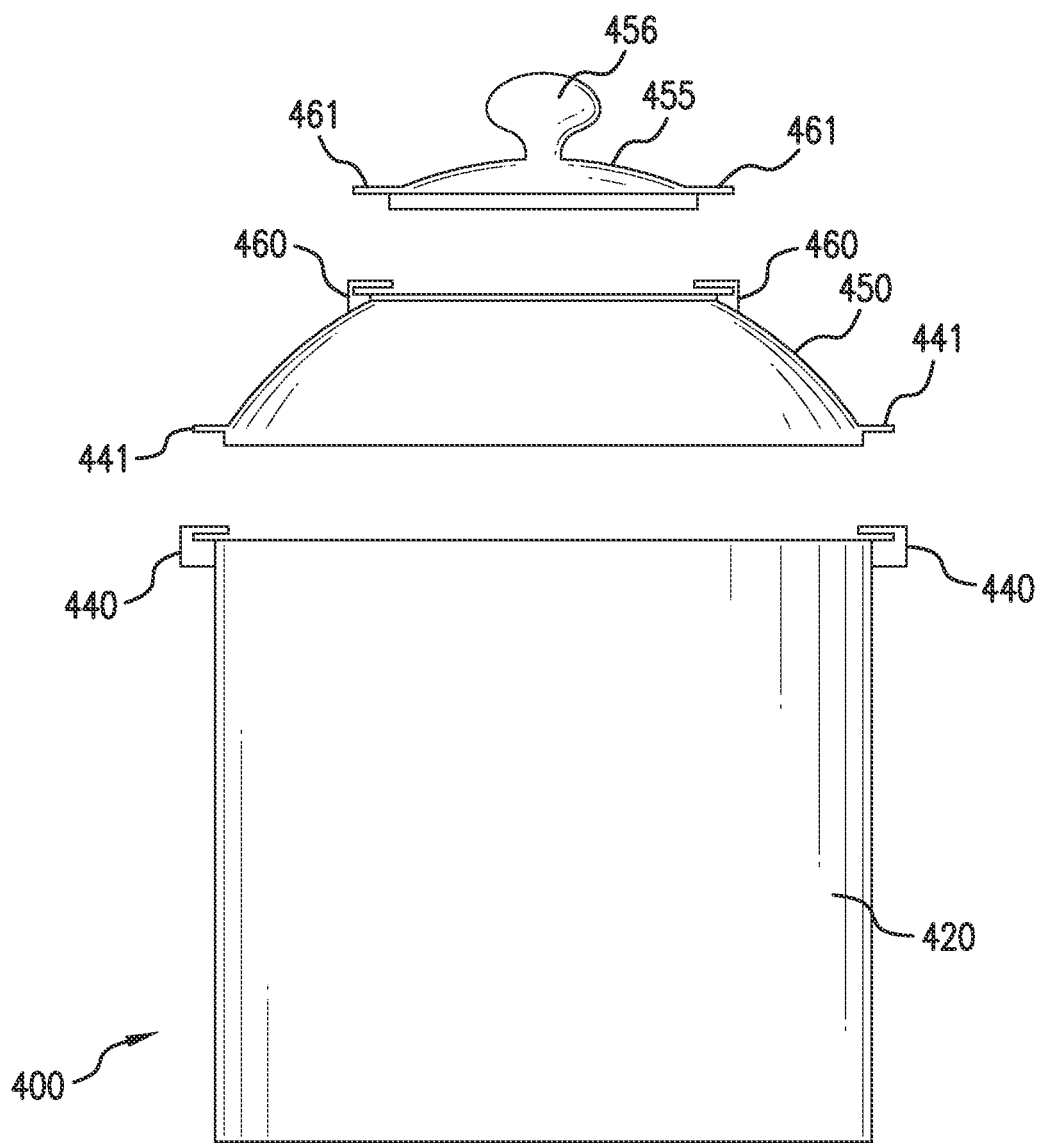
FIG. 24 illustrates an exploded side view of the cooking apparatus of FIG. 22 showing the components of same.

FIG. 24 illustrates an exploded side view of the cooking apparatus 400 of FIG. 22 showing the components of same. In particular, FIG. 24 shows the cooking pot 420, the flange connectors 440, the lower lid assembly 450, the connectors or flanges 441 of the lower lid assembly 450, which mate with the flange connectors 440 of the cooking pot 420, the flange connectors 460 of the lower lid assembly 450, and the upper lid assembly 455, having knob 456, and having the connectors or flanges 461 which mate with the flange connectors 460 of the lower lid assembly 450.

Figure 25:
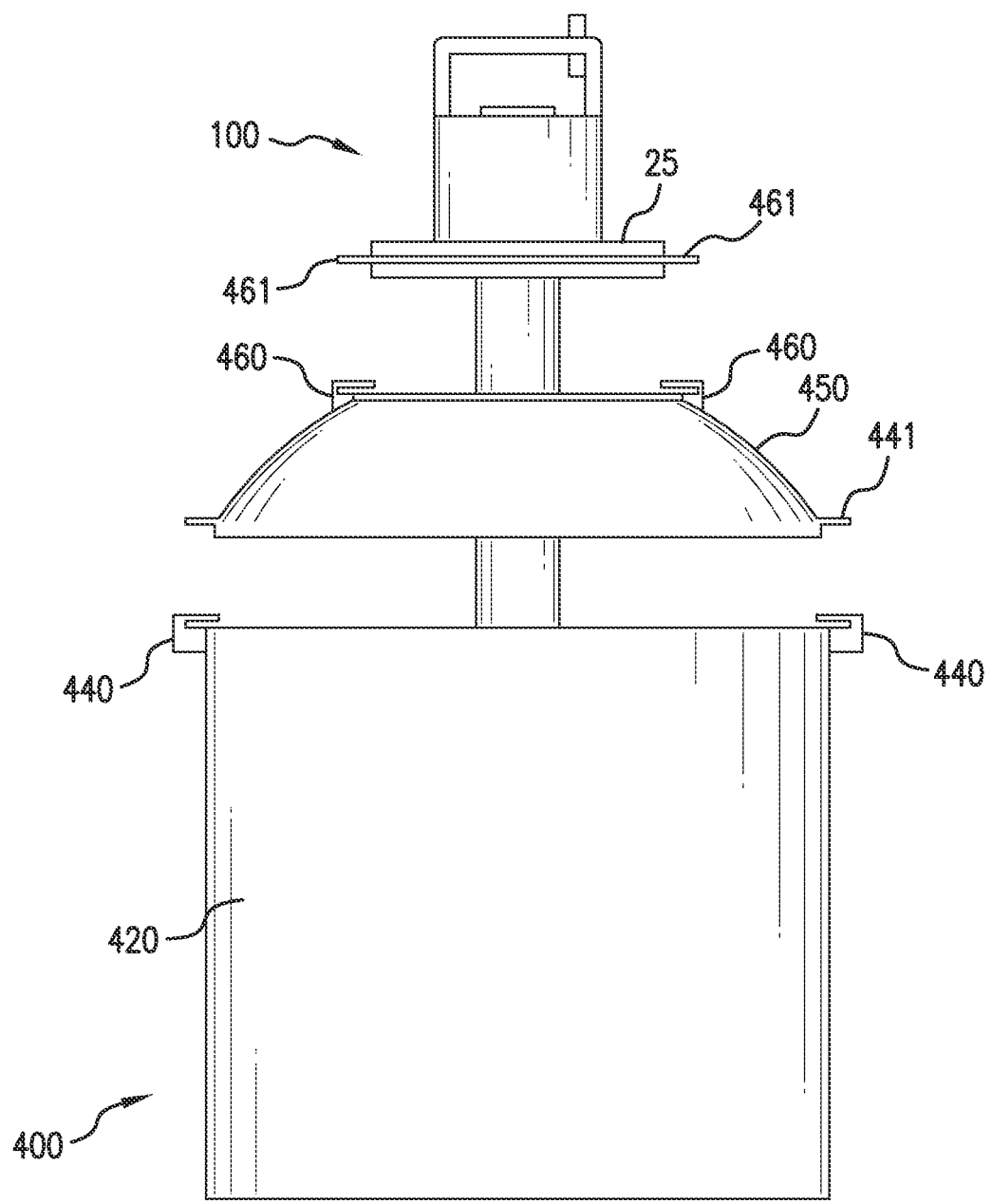
FIG. 25 illustrates an exploded view of a preferred embodiment of the cooking apparatus of the present invention showing the apparatus of Figure and the cooking pot of the cooking apparatus.

FIG. 25 illustrates an exploded view of the cooking apparatus 400 showing the 100 attached and the cooking pot 420 of the cooking apparatus 400. In particular, FIG. 24 shows the cooking pot 420, the flange connectors 440, the lower lid assembly 450, the connectors or flanges 441 of the lower lid assembly 450, which mate with the flange connectors 440 of the cooking pot 420, the flange connectors 460 of the lower lid assembly 450, and the apparatus 100 and connectors or flanges 461 which mate with the flange connectors 460 of the lower lid assembly 450.

In a preferred embodiment, the apparatus 100 can be utilized with interchangeable plates 25 which can have different sizes or diameters so as to accommodate and/or so as to facilitate utilizing the plate 25 to cover the entire open top of any pot or the cooking pot 420, in a manner similar or analogous to the manner shown in the embodiment of FIG. 18. In another preferred embodiment, the apparatus 100 can be utilized with interchangeable plates 25 which can have different sizes or diameters so as to accommodate and/or so as to facilitate utilizing the plate 25 in conjunction with the two-piece lid assembly configuration of the cooking apparatus 400 and, in particular, in order to facilitate using the apparatus 100 with an appropriately sized plate 25 in order to facilitate utilization of the apparatus 100 with a lower lid assembly 450 having any sized opening in the center thereof, as shown in FIG. 21.

In a preferred embodiment, the lower lid assembly 450 can be designed to have a center portion opening, or cutout or hole, of any desired diameter size, with the plate 25 of the apparatus 100 being selected to mate with same as shown in FIG. 21. In this regard, the two-piece lid assembly of FIGS. 22-24 facilitates the use of the cooking pot 420 in order to cook food(s), food ingredient(s), or liquid(s), and then to attach the apparatus 100, in the place of the upper lid assembly 455, in order to perform any food processing operation on or with any of the food(s), food ingredient(s), or liquid(s), which were cooked or prepared in the cooking pot 420.

In another preferred embodiment, the two-piece lid assembly can also be replaced with a one-piece lid assembly. In a preferred embodiment, the lid assembly, whether it be a one-piece assembly or a two-piece assembly can be utilized to cover the cooking pot 420 and the food(s), food ingredient(s), or liquid(s), while same are being cooked therein. Thereafter, the one-piece lid can be removed and the apparatus 100 can be mounted thereon and attached thereto as shown in FIG. 18 or, in the case of a two-piece lid, the upper lid assembly 455 can be removed and the apparatus 100 can be mounted thereon and attached to the lower lid assembly 450, as shown in FIG. 21.

Figure 26:
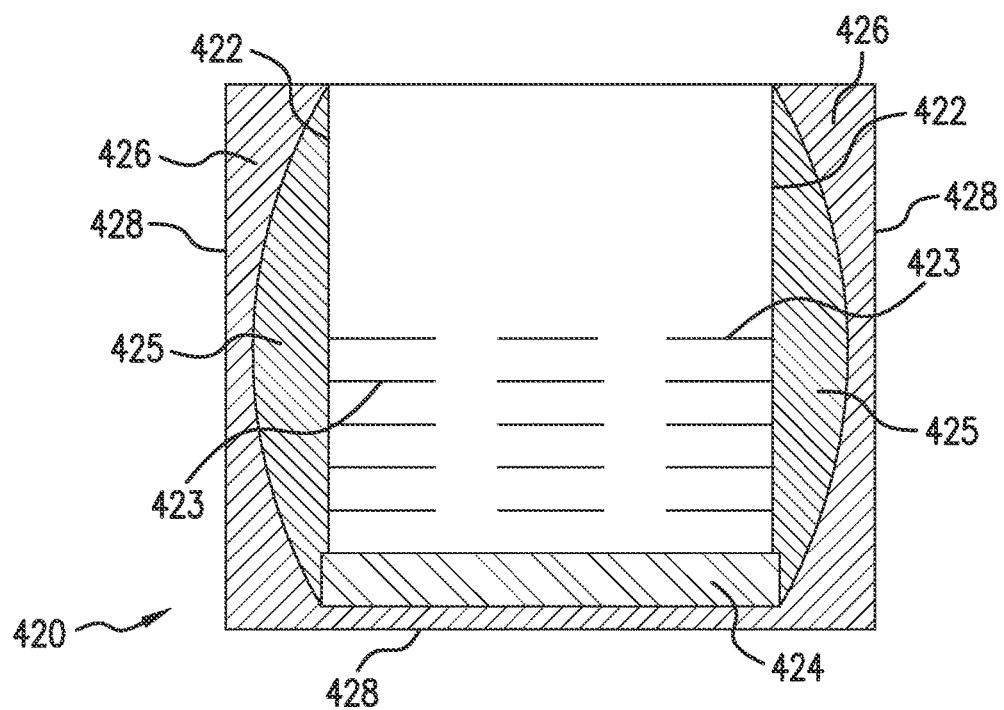
FIG. 26 illustrates a cross-sectional view of a preferred embodiment of the cooking pot of the cooking apparatus of the present invention showing some of the components of same.

FIG. 26 illustrates a cross-sectional view of a preferred embodiment of the cooking pot 420 of the cooking apparatus 400 showing some of the components and features of the cooking pot 420. With reference to FIG. 26, the cooking pot 420 includes an inner cooking pot 422 which can be made of any appropriate material, such as for example, stainless steel or any suitable metal, metal alloy, or made of any other commercially known cooking utensil material or cooking equipment. In a preferred embodiment, the inner cooking pot 422 can be round in shape like a conventional cooking pot. In a preferred embodiment, the inner cooking pot 422 can also contain on the inner side walls thereof, measuring lines, measurement gradients, or measurement markings 423 (hereinafter "measuring lines 423") which can be used by a user in order to measure the amounts of food, food ingredients, or liquids, which are respectively placed or poured into the inner cooking pot 422.

With reference once again to FIG. 26, the cooking pot also contains an electric cooking or heating element 424 (hereinafter "heating element 424") which is located at the bottom end portion of the cooking pot 420 and beneath, and in contact, with the bottom side portion of the inner cooking pot 422, as shown. In a preferred embodiment, the inner cooking pot 422 is placed directly on top of, and against, the heating element 424. In a preferred embodiment, such placement of the inner cooking pot 422 directly on top of, and against, the heating element 424 can serve to provide for maximum heat transfer from the heating element 424 to the inner cooking pot 422. In a preferred embodiment, the heating element 424 can also be sized so as to have a diameter which is larger than the diameter of the bottom portion of the inner cooking pot 422. In another preferred embodiment, the heating element 424 can be sized so as to have a diameter equal to, or smaller than, the diameter of the inner cooking pot 422.

In a preferred embodiment, the heating element 424 can be utilized in order to perform stovetop-like cooking with the cooking pot 420. In a preferred embodiment, the heating element 424 can be of the same type or kind as those heating elements typically utilized in or as electric stove burners on electric stoves which can typically be found in homes and/or in commercial food preparation establishments. In this regard, the heating element 424 can be of the same type of kind of heating element as those heating elements use for stovetop cooking on, or in connection with, electric stove burners. In a preferred embodiment, the heating element 424 can be designed and utilized in order to perform stovetop or stovetop-like cooking operations or tasks, with heating temperatures at least the same as, or comparable to, the maximum cooking temperatures of conventional household electric stove burners or gas stove burners or commercial electric stove burners or commercial gas stove burners. In this regard, the cooking pot 420 can be utilized in order to perform stovetop cooking or stovetop-like cooking operations or tasks. In this regard, the cooking pot 420 is not limited to performing only slow cooking operations or tasks.

With reference once again to FIG. 26, the cooking pot 420 also include a wrap-around jacket heating element 425

(hereinafter "jacket heating element 425") which is placed around, or surrounds, the inner cooking pot 422, as shown. In a preferred embodiment, the jacket heating element extends from the top portion of the inner cooking pot 424 to the bottom of the heating element 424 as shown. In a preferred embodiment, the jacket heating element is designed to wrap around, and to be situated against, the outer side walls of the inner cooking pot 422 so as to be placed in contact with, and against, the outer side walls of the inner cooking pot 422, as shown, so as to provide for maximum heat transfer from the jacket heating element 425 to the inner cooking pot 422. In a preferred embodiment, the jacket heating element 424 can be designed to provide the heating capabilities of heating elements found in conventional slow cookers as well as to provide the heating capabilities found in typical electric stove burners. In a preferred embodiment, the jacket heating element 425 can have the same heating specifications and capabilities as the heating element 424.

With reference once again to FIG. 26, the cooking pot 420 can also contain insulating material or insulation 426 which is provided between the interior side walls of the housing 428 of the cooking pot 420 and the interior components of the cooking pot 420. In this regard, insulation 426 is provided between the heating element 424 and the inner side of the bottom portion of the housing 428, and is provided between the jacket heating element 425 and the interior side walls of the housing 428. In applications in which the jacket heating element 425 does not extend the complete length or height of the inner cooking pot 420, then, in a preferred embodiment, insulation can also be provided between the outer side walls of the inner cooking pot 420 and the interior side walls of the housing 428.

In a preferred embodiment, the insulation 426 is designed to completely contain and/or dissipate the heat produced by the heating element 424 and the jacket heating element 425 and to minimize and/or to prevent the transfer of that heat to the housing 428. In a preferred embodiment, the housing 428 of the cooking pot 420 can be made, formed, or constructed, of any suitable material or materials which can contain and dissipate heat which is generated by the cooking pot 420 so as to maintain the surface temperature of the cooking pot 420 at a safe level during use of the cooking pot 420. In a preferred embodiment, the material or materials used in making, forming, or constructing, the housing 428 can be any suitable material or materials which are typically or otherwise known or utilized for or in manufacturing insulated cooking devices and/or cooking utensils. In a preferred embodiment, the material or materials used in making, forming, or constructing, the housing 428 can be any suitable material or materials which are typically or otherwise known or utilized for or in controlling, and in maintaining at a safe temperature level, the exteriors of slow cookers, cooking devices, and/or other cooking utensils. In a preferred embodiment, the housing 428, and/or any exterior wall(s) of the housing 428, can be made of any suitable porcelain material, ceramic material, or any other suitable non-heat conducting material or materials or heat insulating material or materials.

Figure 27:
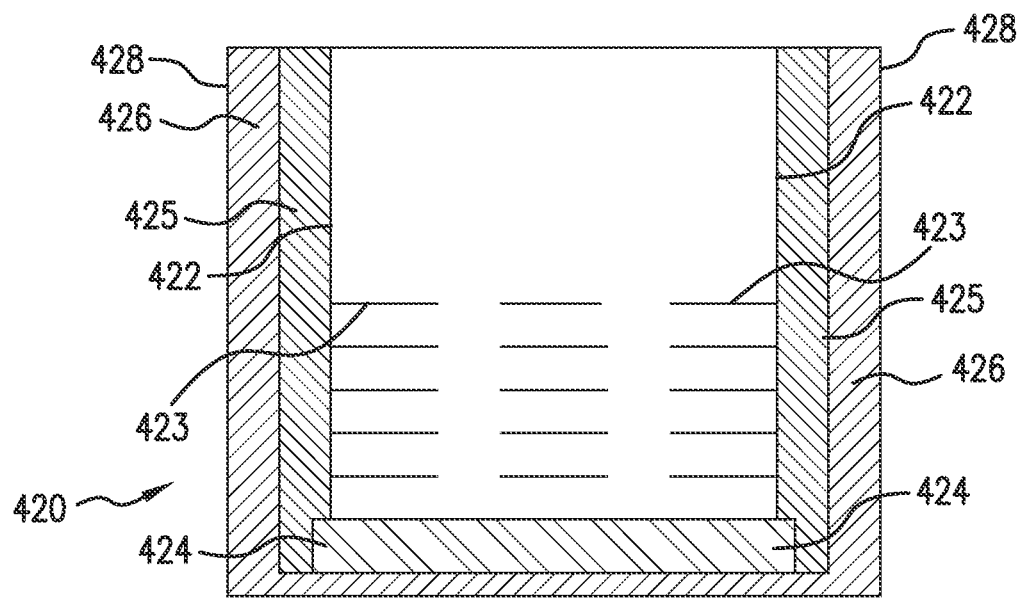
FIG. 27 illustrates another preferred embodiment of the jacket heating element of the cooking pot of FIG. 26.

In a preferred embodiment, the jacket heating element 425 can have a tapering cross sectional shape as shown in FIG. 26, or the jacket heating element 425, in another preferred embodiment, can have a cylindrical-like cross sectional shape, as shown in FIG. 27. FIG. 27 illustrates another preferred embodiment of the jacket heating element 425 of the cooking pot 420. With reference to FIG. 27, the jacket heating element 425 is shown having a uniform thickness as it extends upwards and along the exterior side walls of the inner cooking pot 422, as shown.

Figure 28A:
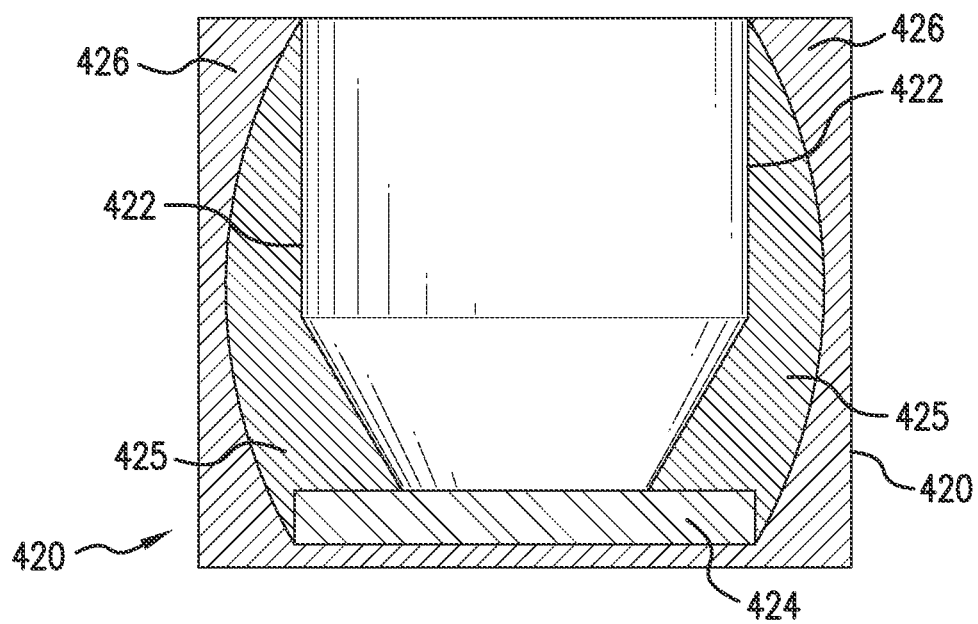
FIGS. 28A, 28B, and 28C illustrate other preferred embodiment designs for the cooking pot of FIG. 26.
Figure 28B:
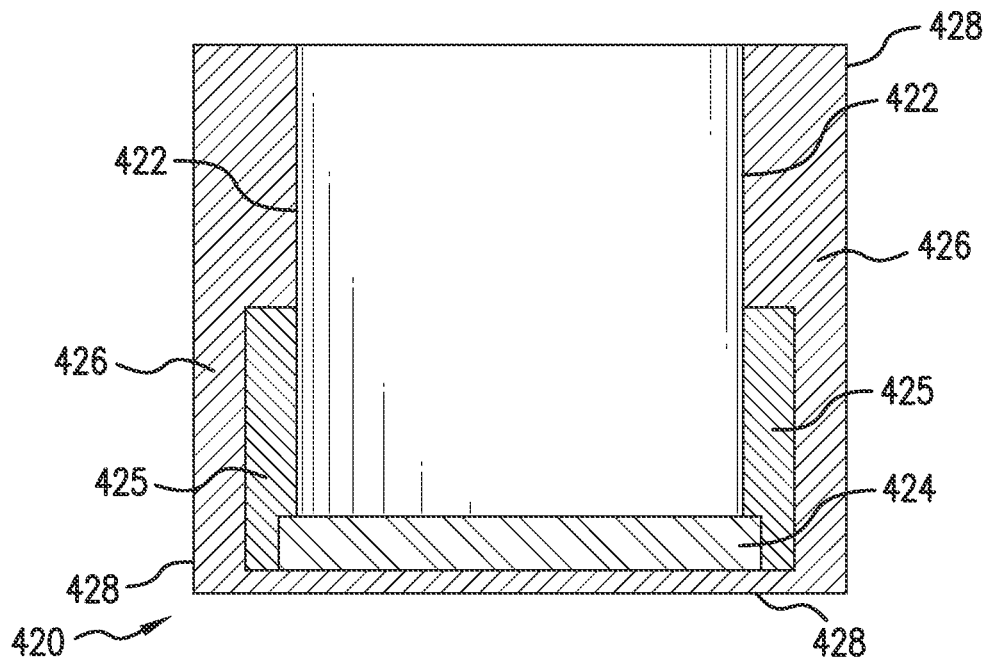
Figure 28C:
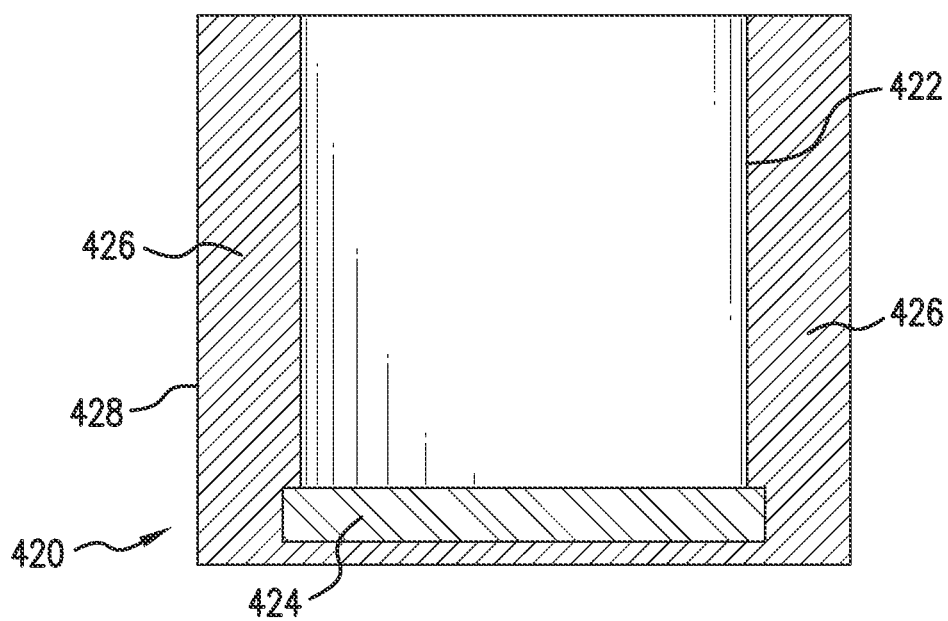

FIGS. 28A, 28B, and 28C illustrate other preferred embodiment designs for the cooking pot 420. With reference to FIG. 28A, the lower portion of the inner cooking pot 422 can be tapered, as shown, so that the diameter of the lower portion of same is smaller than the diameter of the upper portion of same. With reference to FIG. 28B, the jacket heating element 425 can extend only partially along the side walls of the inner cooking pot 422 as shown. With reference to FIG. 28C, the cooking pot 420 can also be designed so as to have only heating element 424 and thereby dispense with need for the jacket heating element 424.

Figure 29:
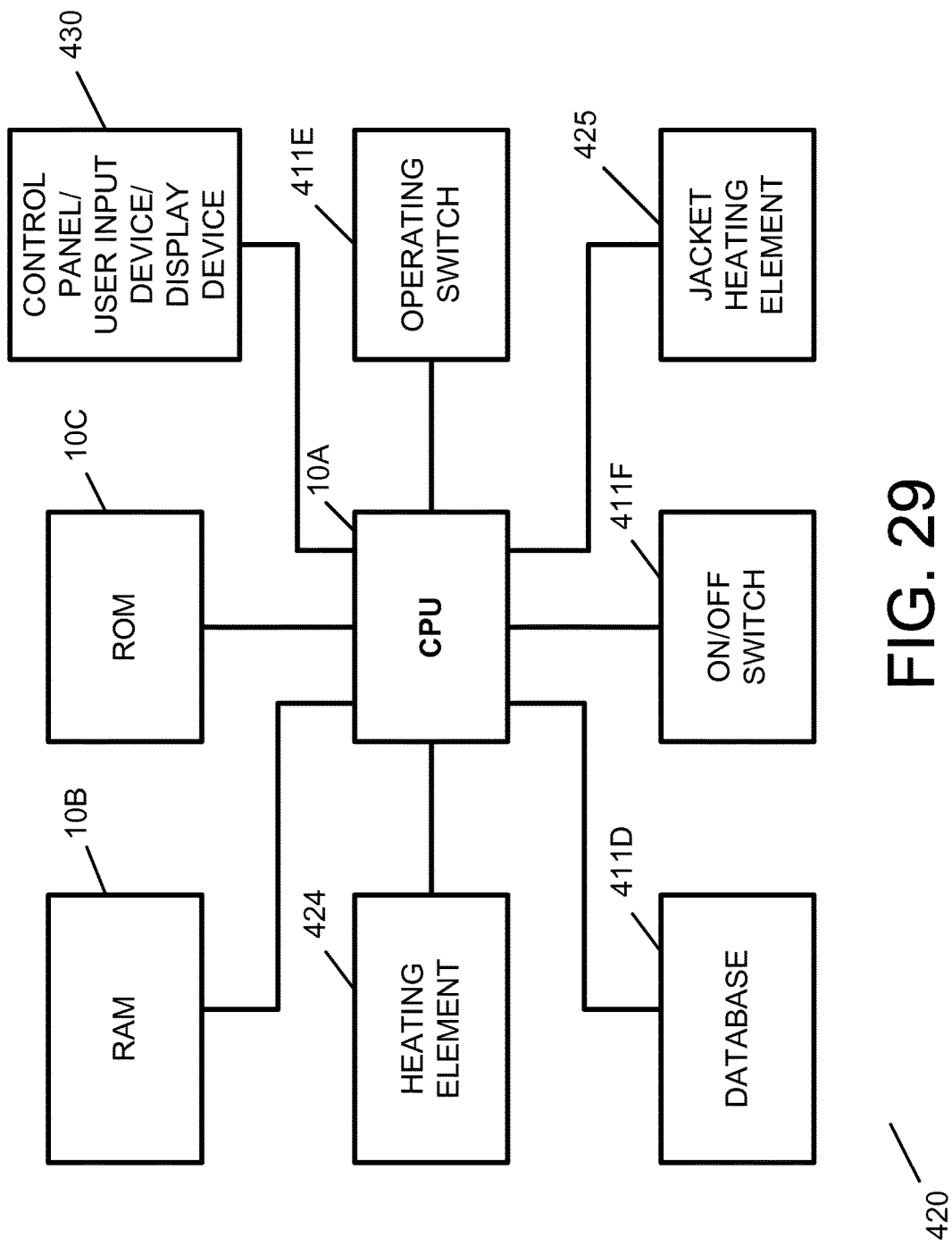
FIG. 29 illustrates a preferred embodiment of the cooking pot of the cooking apparatus of the present invention illustrating the various components of same which are utilized in controlling the operation of, and/or the operating mode of the cooking pot, in block diagram form.

FIG. 29 illustrates a preferred embodiment of the cooking pot 420 of the cooking apparatus 400 of the present invention illustrating the various components of same which are utilized in controlling the operation of, and/or the operating mode of the cooking pot 420, in block diagram form. With reference to FIG. 29, the cooking pot 420 includes a central processing unit (CPU) 411A, which can process any data, information, and/or instructions, for activating, de-activating, enabling, disabling, and/or controlling an operation of the cooking pot 420. The cooking pot 420 also includes a random access memory (RAM) 411B for storing any data and/or information which can be utilized by the central CPU 411A. The cooking pot 420 also includes a read only memory (ROM) 411C for storing any data and/or information which can be utilized by the central CPU 411A. In a preferred embodiment, both the RAM 411B and the ROM 411C are connected to the CPU 411A.

With reference once again to FIG. 29, the CPU 411A is also connected to the heating element 424. The CPU 411A controls the operation of the heating element 424. With reference once again to FIG. 29, the CPU 411A is also connected to the jacket heating element 425. The CPU 411A controls the operation of the jacket heating element 425. The cooking pot 420 can also include a database 411D which can store any data, information, and/or instructions, which can be utilized by the CPU 411A. In a preferred embodiment, the CPU 411A, the RAM 411B, the ROM 411C, the heating element 424, the jacket heating element 425, and the database 411D, are all housed within the housing 428 of the cooking pot. With reference once again to FIG. 29, an operating switch 411E is also connected to the CPU 411A. In a preferred embodiment, an On/Off Switch 411F is also connected to the CPU 411A. A control panel 430, which can contain a user input device(s) and a display device, is also connected to the CPU 411A.

In a preferred embodiment, the user can select the mode of operation or the modes of operation of the cooking pot 420 via the control panel 430, and can activate the cooking pot 420 via the operating switch 411E and/or the On/Off Switch 411F so as to operate the cooking pot 420 as desired. The cooking pot 420 and, in particular, the CPU 411A, can be programmed to control the mode(s) of operation of the cooking pot 420, the heating element 424, and the jacket heating element 425, as well as to control the operating temperature(s) of the cooking pot 420, in order to facilitate the use of the cooking pot 420 as desired and/or in any suitable mode(s) of operation or in any desired sequential modes of operation.

In a preferred embodiment, the CPU 411A can be programmed with various cooking modes of operation(s), and any cooking temperatures and corresponding cooking times corresponding thereto, including, for example, but not limited to, heating temperatures and times of and for the heating element 424 and/or of and for the jacket heating element 425, in order to perform low temperature cooking operations, medium temperature cooking operations, high temperature cooking operations, slow cooking operations, stovetop cooking operations, food warming operations, and/or any other cooking operations which can be performed by the cooking pot 420. The CPU 411A can also be preprogrammed and/or programmed for cooking foods, food ingredients, and/or liquids, and for performing automatic sequential cooking operations for cooking foods, food ingredients, or liquids. In this regard, the CPU 411A can be preprogrammed or can be programmed with predetermined operating mode settings, as well as any corresponding cooking temperatures or cooking temperature settings and any cooking times allocated for each of the cooking temperatures or cooking temperature settings. The CPU 411A can also be preprogrammed, or can be programmed, so as to automatically control various types of kinds of cooking modes of operation in order to effectuate or perform various cooking techniques.

In a preferred embodiment, the apparatus 100 and the cooking pot 420 can be utilized in conjunction with one another in order to cook or prepare various food(s), food ingredient(s), or liquids, with and using the cooking pot 420, and to thereafter process the food(s), the food ingredient(s), or the liquid(s), with the apparatus 100. In a preferred embodiment, the apparatus 100 can be attached to the cooking pot 420 during any and/or all cooking operations performed by the cooking pot 420. In another preferred, the apparatus 100 can be attached to the cooking pot 420, in any of the manners described herein, after and and/or all cooking operations by the cooking pot 420 have been completed. In another preferred embodiment the apparatus 100 can be utilized to perform a food processing operation on foods located in the cooking pot 420 while the cooking pot 420 is performing a cooking operation or task.

In a preferred embodiment, the cooking pot 420 can be utilized to perform any cooking operation or process which is capable of being performed on, with, or using, a conventional stove, an electric stove, or a commercial stove, and came perform any operation such a boiling operation, a steaming operation, a simultaneous boiling an steaming operation, a frying operation, or a sautéing operation, or any combination of or involving same.

Applicant hereby incorporates by reference herein the subject matter and teachings of U.S. Patent Application Ser. No. 61/972,729, filed Mar. 31, 2014, which teaches and describes a reduced calorie vegetable-based or fruit-based food product and/or a reduced calorie vegetable-based or fruit-based food product ingredient and process and/or method for preparing or making same, the subject matter and teachings of which are incorporated by reference herein in their entirety. The apparatus 100 of the present invention can be utilized in practicing the inventions described in U.S. Patent Application Ser. No. 61/972,729.

Applicant hereby incorporates by reference herein the subject matter and teachings of U.S. Patent Application Ser. No. 61/981,524, filed Apr. 18, 2014, which teaches and describes a reduced calorie vegetable-based or fruit-based food product and/or a reduced calorie vegetable-based or fruit-based food product ingredient and process and/or method for preparing or making same, the subject matter and teachings of which are incorporated by reference herein in their entirety. The apparatus 100 of the present invention can be utilized in practicing the inventions described in U.S. Patent Application Ser. No. 61/981,524.

In any and/or all of the embodiments described herein, the apparatus 100, 200, or 400 can be utilized in order to perform any type or kind of food processing operation, including, but not limited to, is a chopping operation, a mixing operation, a blending operation, a liquefying operation, a grating operation, a beating operation, a whipping operation. a whisking operation, a stirring operation, a pureeing operation, a pulsing operation, an ice crushing operation, a crumbing operation, an extracting operation, a dough preparing operation, a smoothie preparing operation, or a high speed operation, or any other food processing operation, on a food, a food ingredient, before same is cooked.

In any and/or all of the embodiments described herein, the apparatus 100, 200, or 400 can be utilized in order to perform any type or kind of food processing operation, including, but not limited to, is a chopping operation, a mixing operation, a blending operation, a liquefying operation, a grating operation, a beating operation, a whipping operation. a whisking operation, a stirring operation, a pureeing operation, a pulsing operation, an ice crushing operation, a crumbing operation, an extracting operation, a dough preparing operation, a smoothie preparing operation, or a high speed operation, or any other food processing operation, on a food, a food ingredient, during a cooking operation on or involving same, or while same is in the processed of being cooked or undergoing a cooking operation or process.

In any and/or all of the embodiments described herein, the apparatus 100, 200, or 400 can be utilized in order to perform any type or kind of food processing operation, including, but not limited to, is a chopping operation, a mixing operation, a blending operation, a liquefying operation, a grating operation, a beating operation, a whipping operation. a whisking operation, a stirring operation, a pureeing operation, a pulsing operation, an ice crushing operation, a crumbing operation, an extracting operation, a dough preparing operation, a smoothie preparing operation, or a high speed operation, or any other food processing operation, on a food, a food ingredient, after same has been cooked or upon the completion of a cooking operation or cooking process with or involving same.

In any and/or all of the embodiments described herein, the cooking apparatus 400 and/or the cooking pot 420 is capable of being used to boil, to steam or to simultaneously boil and steam a food or a food ingredient.

In any and/or all of the embodiments described herein, the apparatus 100, the apparatus 200, the cooking apparatus 400, and/or the cooking pot 420, are each capable, separately and/or in any combination, of being used to practice the inventions disclosed and taught by U.S. Patent Application Ser. No. 61/972,729, filed Mar. 31, 2014, which teaches and describes a reduced calorie vegetable-based or fruit-based food product and/or a reduced calorie vegetable-based or fruit-based food product ingredient and process and/or method for preparing or making same, the subject matter and teachings of which are incorporated by reference herein in their entirety.

In any and/or all of the embodiments described herein, the apparatus 100, the apparatus 200, the cooking apparatus 400, and/or the cooking pot 420, are each capable, separately and/or in any combination, of being used to practice the inventions disclosed and taught by U.S. Patent Application Ser. No. 61/981,524, filed Apr. 18, 2014, which teaches and describes a reduced calorie vegetable-based or fruit-based food product and/or a reduced calorie vegetable-based or fruit-based food product ingredient and process and/or method for preparing or making same, the subject matter and teachings of which are incorporated by reference herein in their entirety.

While the present invention has been described and illustrated in various preferred and alternate embodiments, such descriptions are merely illustrative of the present invention and are not to be construed to be limitations thereof. In this regard, the present invention encompasses all modifications, variations and/or alternate embodiments, with the scope of the present invention being limited only by the claims which follow.

What is claimed is:

1. An apparatus, comprising:
    a food processor, comprising:
        a food processor housing, wherein the food processor housing comprises a first food processor housing section and a second food processor housing section, wherein the first food processor housing section houses an electric motor, and further wherein the second food processor housing section is elongate in shape and houses at least a portion of a rotating member, wherein the second food processor housing section has a first end portion and a second end portion, and further wherein the first end portion of the second food processor housing section is connected or attached to the first food processor housing section;
        a food processing attachment, wherein the food processing attachment has at least one food processing element,
    wherein the food processing attachment is connected to or attached to the second end portion of the second food processor housing section, and further wherein the rotating member is mechanically connected or coupled to the food processing attachment; and
        a plate, wherein the plate has an opening for receiving the second food processor housing section, wherein the second food processor housing section is capable of being slideably moved in and through the opening in the plate in a bi-directional manner by a movement of the second food processor housing section vertically up or down through the opening in the plate during a cooking operation or during a food processing operation, and further wherein the apparatus further comprises:
    a cooking pot, comprising:
        a cooking pot housing;
        an inner cooking pot situated within the cooking pot housing;
        a first heating element, wherein the inner cooking pot is situated above the first heating element;
        a second heating element, wherein the second heating element surrounds, or is located around and against, at least a portion of the inner cooking pot,
    wherein the first heating element and the second heating element are capable of providing heat for performing a cooking operation on or regarding a food, a food ingredient, or a liquid, and further wherein the electric motor is capable of driving a rotation of the rotating member, wherein the rotating member is capable of driving a rotation of the food processing attachment and the at least one food processing element in order to perform a food processing operation on or regarding the food, the food ingredient, or the liquid, prior to, during, or after, a completion of the cooking operation, and further wherein a vertical position of the at least one food processing element is capable of being moved from a first position to a second position within the inner cooking pot during a cooking operation or during a food processing operation by a movement of the second food processor housing section up or down through and along the opening in the plate.

2. The apparatus of claim 1, wherein the plate is sized to rest on, or to be placed on, a top end of the cooking pot, a cooking container, or a cooking utensil.

3. The apparatus of claim 1, wherein the cooking pot further comprises:
    a measuring line or measuring lines located on an interior side wall of the inner cooking pot.

4. The apparatus of claim 1, wherein the apparatus further comprises:
    a lid assembly, wherein the lid assembly further comprises:
        a lower lid assembly, wherein the lower lid assembly has an opening in a center region thereof; and
        an upper lid assembly, wherein the upper lid assembly is attachable to the lower lid assembly and is detachably removable from the lower lid assembly,
    wherein the lid assembly is attachable to a top of the cooking pot.

5. The apparatus of claim 4,
    wherein the food processor is attachable to the lower lid assembly in place of the upper lid assembly.

6. The apparatus of claim 1, wherein the food processor further comprises:
    a controller, wherein the controller controls a food processing operation of the food processor, wherein the food processing operation is a chopping operation, a mixing operation, a blending operation, a liquefying operation, a grating operation, a beating operation, a whipping operation, a whisking operation, a stirring operation, a pureeing operation, a pulsing operation, an ice crushing operation, a crumbing operation, an extracting operation, a dough preparing operation, or a smoothie preparing operation, and further wherein the controller is located within the first food processor housing section.

7. The apparatus of claim 1, wherein the cooking pot further comprises:
    a controller for controlling a cooking operation of the cooking pot, wherein the cooking operation is a stovetop cooking operation or a slow cooking operation.

8. The apparatus of claim 1, wherein the food processor is capable of performing a food processing operation on a food, a food ingredient, or a liquid, before the food, the food ingredient, or the liquid, is or has been cooked, wherein the food processing operation is a chopping operation, a mixing operation, a blending operation, a liquefying operation, a grating operation, a beating operation, a whipping operation, a whisking operation, a stirring operation, a pureeing operation, a pulsing operation, an ice crushing operation, a crumbing operation, an extracting operation, a dough preparing operation, or a smoothie preparing operation.

9. The apparatus of claim 1, wherein the food processor is capable of performing a food processing operation on a food, a food ingredient, or a liquid, during a cooking operation on, with, or involving, the food, the food ingredient, or the liquid, or while the food, the food ingredient, or the liquid, is in a process of being cooked, wherein the food processing operation is a chopping operation, a mixing operation, a blending operation, a liquefying operation, a grating operation, a beating operation, a whipping operation, a whisking operation, a stirring operation, a pureeing operation, a pulsing operation, an ice crushing operation, a crumbing operation, an extracting operation, a dough preparing operation, or a smoothie preparing operation.

10. The apparatus of claim 1, wherein the food processor is capable of performing a food processing operation on a food, a food ingredient, or a liquid, after a cooking operation on, with, or involving, the food, the food ingredient, or the liquid, has ceased or after the food, the food ingredient, or the liquid, has been cooked, wherein the food processing operation is a chopping operation, a mixing operation, a blending operation, a liquefying operation, a grating operation, a beating operation, a whipping operation, a whisking operation, a stirring operation, a pureeing operation, a pulsing operation, an ice crushing operation, a crumbing operation, an extracting operation, a dough preparing operation, or a smoothie preparing operation.

11. An apparatus, comprising:
a cooking pot, comprising:
  a cooking pot housing;
  an inner cooking pot situated within the cooking pot housing;
  a first heating element, wherein the inner cooking pot is situated above the first heating element; and
  a second heating element, wherein the second heating element surrounds, or is located around and against, at least a portion of the inner cooking pot, and
a food processor, comprising:
  a main housing, wherein a controller is housed within the main housing;
  a longitudinal housing portion having a first end portion attached to the main housing and having a second end portion which is capable of being lowered into or positioned within the inner cooking pot;
  a food processing attachment having at least one food processing element, wherein the food processing attachment is connected to, or attached to, the second end portion of the longitudinal housing; and
  a plate, wherein the plate has an opening, wherein the longitudinal housing portion of the food processor is capable of being slideably moved in a bi-directional manner up or down in and through the opening in the plate during a cooking operation or during a food processing operation, wherein a vertical position of the food processing element is capable of being moved from a first position to a second position within or inside the inner cooking pot during a cooking operation or during a food processing operation by a movement of the longitudinal housing portion up or down through the opening in the plate.

12. An apparatus, comprising:
a food processor, wherein the food processor further comprises:
  a housing, wherein the housing further comprises:
    a first housing section; and
    a second housing section, wherein the second housing section is elongate in shape and houses at least a portion of a rotating member, wherein the second housing section has a first end portion and a second end portion, and further wherein the first end portion of the second housing section is connected or attached to the first housing section;
  a food processing attachment, wherein the food processing attachment has at least one food processing element, wherein the food processing attachment is connected to or attached to the second end portion of the second housing section, and further wherein the rotating member is mechanically connected or coupled to the food processing attachment; and
  a plate, wherein the plate is capable of serving as a cover or a lid for a cooking pot, wherein the cooking pot is capable of being heated by a heating source, wherein the plate has an opening for receiving the second housing section, wherein the second housing section is capable of being slideably moveable in and through the opening in the plate in a bi-directional manner to raise or lower a position of the food processing attachment, or to move the food processing attachment up or down, inside the cooking pot by a movement of the second housing section vertically up or down through the opening in the plate during a cooking operation or during a food processing operation in the cooking pot.

13. The apparatus of claim 12, further comprising:
the cooking pot, wherein the plate is sized to be placeable on a top of, or to cover a top of, the cooking pot, and further wherein the heating source is a gas stove burner, an electric stove heating element, or a slow cooker heating element.

14. The apparatus of claim 13, further comprising:
a cooking pot housing, wherein the cooking pot is contained within the cooking pot housing, and further wherein the cooking pot housing further comprises:
  a heating element, wherein the heating element is the heating source.

15. The apparatus of claim 14, wherein the cooking pot housing further comprises:
a second heating element,
wherein the heating element is positioned beneath the cooking pot, and wherein the second heating element is positioned around, or positioned to surround, at least a portion of the cooking pot.

16. The apparatus of claim 12, further comprising:
a height adjuster element, wherein the height adjuster element is capable of maintaining the first housing section at a vertical distance from or above the plate during the cooking operation or during the food processing operation.

17. The apparatus of claim 12, wherein a length of the second housing section is adjustable.

18. The apparatus of claim 12, wherein a length of the second housing section is adjustable, and further wherein the second housing section further comprises:
an upper member;
a lower member; and
a spring,
wherein the upper member and the lower member each have a circular cross section, wherein a circular cross section of the upper member is smaller than a circular cross section of the lower member to facilitate at least a portion of the upper member being moveable to a location inside or within an interior of the lower member, and further wherein the spring provides a biasing force against a movement of the upper member into or within the lower member, wherein the spring facilitates an expansion of a length of the second housing section in an absence of a counter force being applied to the spring, and further wherein the spring facilitates a compression of a length of the second housing section in response to a counter force being applied to the spring.

19. The apparatus of claim 12, wherein a length of the second housing section is adjustable, and further wherein the second housing section further comprises:
an upper member;
a lower member; and a spring, wherein the upper member and the lower member each have a non-circular cross section, wherein a non-circular cross section of the upper member is smaller than a non-circular cross section of the lower member to facilitate at least a portion of the upper member being moveable to a location inside or within an interior of the lower member, and further wherein the spring provides a biasing force against a movement of the upper member into or within the lower member, wherein the spring facilitates an expansion of a length of the second housing section in an absence of a counter force being applied to the spring, and further wherein the spring facilitates a compression of a length of the second housing section in response to a counter force being applied to the spring.

20. The apparatus of claim 12, further comprising:

a cooking pot housing, wherein the cooking pot housing further comprises:

the cooking pot, wherein the cooking pot is contained within the cooking pot housing;

a first heating element; and a second heating element, wherein either the first heating element or the second heating element is capable of being the heating source, wherein the first heating element is positioned beneath the cooking pot, and wherein the second heating element is positioned around, or positioned to surround, at least a portion of the cooking pot.

* * * * *